United States Patent
Ahn et al.

(10) Patent No.: US 7,902,787 B2
(45) Date of Patent: Mar. 8, 2011

(54) DRIVING CIRCUIT FOR SINGLE-PHASE SWITCHED RELUCTANCE MOTOR AND DRIVING METHOD THEREOF

(75) Inventors: Jinwoo Ahn, Busan (KR); Donghee Lee, Busan (KR)

(73) Assignee: Kyungsung University Industry Cooperation Foundation, Busan (KR)

( * ) Notice: Subject to any disclaimer, the term of this patent is extended or adjusted under 35 U.S.C. 154(b) by 204 days.

(21) Appl. No.: 12/083,261

(22) PCT Filed: Apr. 19, 2007

(86) PCT No.: PCT/KR2007/001908
§ 371 (c)(1),
(2), (4) Date: Apr. 7, 2008

(87) PCT Pub. No.: WO2007/123327
PCT Pub. Date: Nov. 1, 2007

(65) Prior Publication Data
US 2009/0153095 A1 Jun. 18, 2009

(30) Foreign Application Priority Data
Apr. 21, 2006 (KR) .......... 10-2006-0036367

(51) Int. Cl.
*H02P 1/46* (2006.01)
(52) U.S. Cl. .......... 318/701; 318/767; 318/773
(58) Field of Classification Search .......... 318/701, 318/773, 798, 775, 801, 400.01; 381/767; 323/283
See application file for complete search history.

(56) References Cited

U.S. PATENT DOCUMENTS

| | | | |
|---|---|---|---|
| 4,616,165 A | | 10/1986 | Compter |
| 4,642,535 A | * | 2/1987 | Hucker .......... 318/161 |
| 5,053,938 A | * | 10/1991 | Fratta .......... 363/37 |
| 5,138,244 A | | 8/1992 | Bahn |
| 6,906,503 B2 | | 6/2005 | Lopez-Santillana et al. |

* cited by examiner

*Primary Examiner* — Karen Masih
(74) *Attorney, Agent, or Firm* — Kile Park Goekjian Reed & McManus PLLC

(57) ABSTRACT

Disclosed are a driving circuit for a single-phase SRM and a driving method thereof. The driving circuit for the single-phase SRM includes a switched reluctance motor, a voltage source which supplies energy to the switched reluctance motor, and an inverter circuit which is connected to the switched reluctance motor in parallel so as to temporarily store energy of the voltage source, and then supply the energy to the switched reluctance motor.

23 Claims, 23 Drawing Sheets

[Fig. 1] - Prior Art
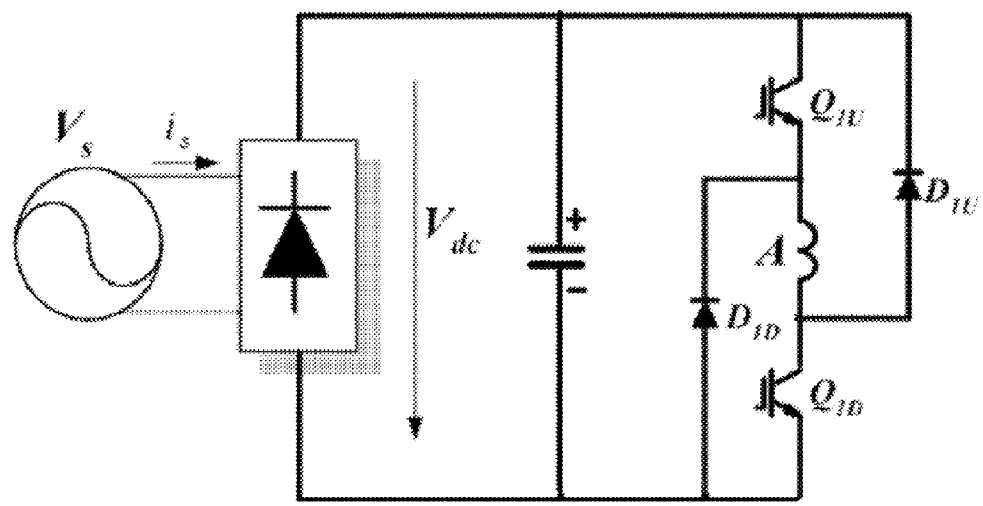
[Fig. 2]
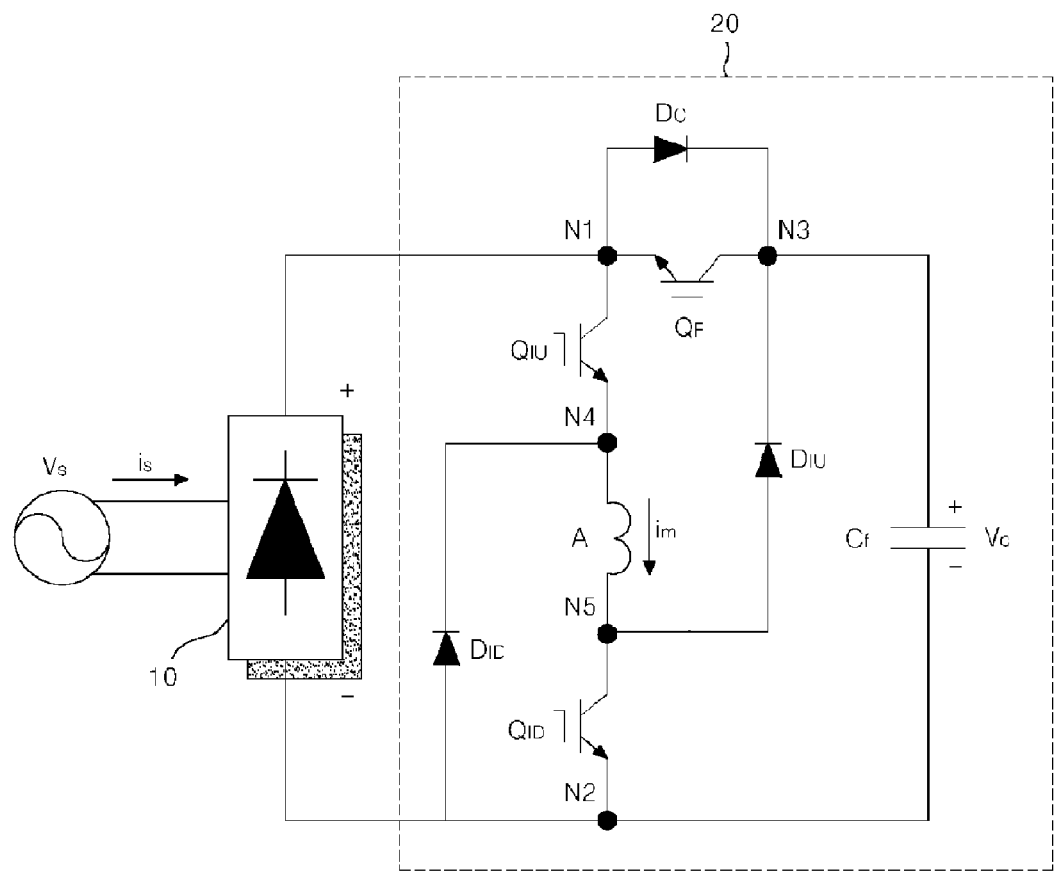

DRIVING CIRCUIT FOR SINGLE-PHASE SWITCHED RELUCTANCE MOTOR AND DRIVING METHOD THEREOF

TECHNICAL FIELD

The present invention relates to a single-phase switched reluctance motor and a driving method thereof. More particularly, the present invention relates to a single-phase switched reluctance motor and a driving method thereof, capable of minimizing a torque ripple and achieving a high power factor.

BACKGROUND ART

Since a single-phase switched reluctance motor (SRM) has a simple electromagnetic structure, a simple driving circuit, and a strong mechanical structure, and can be accelerated or decelerated with a high efficiency, a high torque and a wide operational range. Accordingly, the single-phase switched reluctance motor (SRM) has been widely used in various industrial fields and home electronic appliance fields.

In order to drive the single-phase SRM, a diode rectifier or an AC/DC converter, and an SRM inverter have been used to apply pulse type voltage, which is generated from a voltage source, to the single-phase SRM. The single-phase SRM essentially requires DC voltage. In general, the single-phase SRM has acquired the DC voltage through a circuit including an AC/DC converter and a filter capacitor having a large capacity.

FIG. 1 is a circuit diagram showing the conventional single-phase SRM driving circuit.

Referring to FIG. 1, the conventional single-phase SRM driving circuit includes an inverter circuit having a diode rectifier for rectifying power, which is supplied from a voltage source $V_s$, into direct current (DC) power and a large-capacity capacitor used to restrict peak torque ripples.

When the single-phase SRM is driven by using the inverter circuit including the conventional large-capacity filter capacitor, the single-phase SRM can restrict peak torque ripples. However, peak AC current flows through the single-phase SRM according to the charge/discharge operation of the large-capacity capacitor, which is connected to the voltage source, so the power factor is remarkably reduced.

Recently, in order to solve the problems, researches and studies have been actively pursued toward a power factor correction (PFC) technique at home and abroad. However, the conventional PFC circuit has complicated control circuits and complicated power circuits. In addition, even though the single-phase SRM is economical or has an improved power factor, torque ripples are seriously caused.

DISCLOSURE

Technical Problem

Accordingly, the present invention has been made to solve the above-mentioned problems occurring in the prior art, and an object of the present invention is to provide a single-phase switched reluctance motor (SRM) driving circuit and a driving method thereof, capable of minimizing torque ripples of power supplied to the single-phase SRM and achieving a high power factor.

Another object of the present invention is to provide a single-phase switched reluctance motor (SRM) driving circuit and a driving method thereof, capable of more clearly restricting torque ripples by providing an inverter circuit to minimize torque ripples of the DC power provided to the single-phase switched reluctance motor (SRM), and mathematically modeling and analyzing a driving method of the inverter circuit.

Technical Solution

In order to accomplish the above objects, according to one aspect of the present invention, there is provided a driving circuit for a single-phase switched reluctance motor includes a switched reluctance motor, a voltage source which supplies energy to the switched reluctance motor, and an inverter circuit which is connected to the switched reluctance motor in parallel so as to temporarily store energy of the voltage source, and then supply the energy to the switched reluctance motor.

The inverter circuit and the voltage source alternately supply energy to the switched reluctance motor.

The inverter circuit includes a capacitor which is connected to the switched reluctance motor, a first node which is arranged between a first side of the switched reluctance motor and the capacitor, a second node which is arranged between a second side of the switched reluctance motor and the capacitor, a discharge switch which is connected between the first node and the capacitor, a first phase switch, a phase winding, and a second switch which are arranged between the first node and the second node, a third node which is arranged between the discharge switch and the capacitor, a fourth node which is arranged between the first phase switch and the phase winding, a fifth node which is arranged between the phase winding and the second phase switch, a first diode which is connected to the discharge switch in parallel, a second diode which is connected between the third node and the fifth node, and a third diode which is connected between the fifth node and the fourth node.

According to another aspect of the present invention, there is provided a driving method of a single-phase switched reluctance motor including the steps of supplying energy of a voltage source to a switched reluctance motor, and alternately supplying energy to the switched reluctance motor by an inverter circuit and the voltage source.

The inverter circuit charges energy of the voltage source while voltage of the voltage source is being supplied to the switched reluctance motor.

The switched reluctance motor includes current establishment duration, torque generation duration, and current retrieve duration, the inverter circuit includes an energy retrieving capacitor, and a discharge current excitation mode, an input current excitation mode, an energy retrieving mode, and a power charging mode.

The source voltage and voltage of the capacitor are represented $V_s = V_{sm} \sin \overline{\omega}t$ ($\overline{\omega}t \in [0,\pi]$) and $V_c = V_{c-av} - V_{cm} \sin 2\overline{\omega}t$ respectively, in which $V_s$ denotes voltage of the voltage source, $V_c$ denotes voltage of the capacitor, $V_m$ denotes voltage of the switched reluctance motor, $V_{sm}$ denotes a maximum value of the voltage of the voltage source, $V_{c-av}$ denotes an average value of charge voltage of the capacitor, and $V_{cm}$ denotes a fluctuation width of the charge voltage of the capacitor.

The equation for the voltage of the capacitor is available only when the voltage of the voltage source is less than the voltage of the capacitor.

Maximum peak phase current $i_{max}$ and minimum peak phase current $i_{min}$ are obtained from $$i_{lim\ it} = \frac{1}{L_{min}}(V_c T_c + V_s T_s)$$

when $$T_c = \frac{\theta_{dw}(1-\sin\varpi t)}{\varpi_{rm}}, \text{ and } T_s = \frac{\theta_{ad}}{\theta_{rm}} - T_c,$$

and a maximum peak torque ripple is represented as $$\Delta T_{max} = \frac{T_{max} - T_{min}}{T_{max} + T_{min}}$$

when $$T_{max} = \frac{1}{2}Ki_{max}^2 \text{ and } T_{min} = \frac{1}{2}Ki_{min}^2,$$

in which $V_s$ denotes voltage of the voltage source, $V_c$ denotes voltage of the capacitor, $\theta_{dw}$ denotes a dynamic dwell angle of the switched reluctance motor, $\theta_{ad}$ denotes an advanced angle between a first time point, in which the switched reluctance motor is driven by the voltage charged in the capacitor, and a second time point, in which a front end portion of a polarity of a rotor meets an end portion of a polarity of a stator, $\overline{\omega}_{rm}$ denotes a rotational speed of the switched reluctance motor, and $L_{min}$ denotes a minimum inductance value of the switched reluctance motor.

Phase current of the switched reluctance motor has a constant value, and current by voltage of the voltage source has a phase identical to a phase of the voltage of the voltage source.

According to another aspect of the present invention, there is provided a driving method for a switched reluctance motor including the steps of supplying energy to the switched reluctance motor by a voltage source for duration corresponding to a value obtained by multiplying a dynamic dwell angle of the switched reluctance motor by a sinusoidal function for present position information, and supplying energy to the switched reluctance motor by a charged capacitor for remaining duration of the dynamic dwell angle.

The capacitor supplies energy to the switched reluctance motor prior to the voltage source.

Advantageous Effects

In a single-phase switched reluctance motor (SRM) driving circuit and a driving method according to an exemplary embodiment of the present invention, a high power factor of the power supplied to the single-phase SRM can be achieved, and the torque ripples of the single-phase SRM can be minimized.

Further, in the single-phase switched reluctance motor (SRM) driving circuit and the driving method according to an exemplary embodiment of the present invention, not only can a power factor be improved, but torque ripples can be reduced by using an inverter circuit.

In addition, a theoretical analysis method for the reduction of the torque ripples is provided by modeling a single-phase SRM driving system, so that the capacity of a capacitor mainly affecting the angular variable of the single-phase switched reluctance motor (SRM) driving system (particularly, the torque ripples) can be easily selected.

Preferred embodiments of the present invention are for illustrative purposes only. It will be apparent to those skilled in the art that various modifications and variations can be made in the present invention. Thus, it is intended that the present invention covers the modifications and variations thereof within the scope of the appended claims.

DESCRIPTION OF DRAWINGS

FIG. 1 is a circuit diagram showing the conventional single-phase SRM driving circuit;

FIG. 2 is a circuit diagram showing a single-phase SRM driving circuit according to an exemplary embodiment of the present invention;

BEST MODE

The above objects, other objects, features, and advantages of the present invention will become readily apparent by reference to the following detailed description when considered in conjunction with the accompanying drawings. Hereinafter, an embodiment of the present invention will be described in detail with reference to the accompanying drawings.

FIG. 2 is a circuit diagram showing a single-phase switched reluctance motor (SRM) driving circuit according to an exemplary embodiment of the present invention.

Referring to FIG. 2, the single-phase SRM driving circuit includes an AC/DC converter which is represented as a diode rectifier 10, source voltage $V_s$ which supplies energy to the diode rectifier 10, and an inverter circuit 20 which is connected to the diode rectifier 10 in parallel so as to temporarily store the energy from the source voltage $V_s$ and then supply the energy to the single-phase SRM.

As shown in FIG. 2, the inverter circuit 20 includes a capacitor $C_f$ which is connected to the diode rectifier 10, a first node N1 which is arranged between a positive terminal + of the diode rectifier 10 and the capacitor $C_f$, a second node N2 which is arranged between a negative terminal − of the diode rectifier 10 and the capacitor $C_f$, a discharge switch $Q_F$ which is connected between the first node N1 and the capacitor $C_f$, a first phase switch $Q_{IU}$ which is arranged between the first node N1 and the second node N2, phase winding A of the SRM, a second phase switch $Q_{ID}$, a third node N3 which is arranged between the discharge switch $Q_F$ and the capacitor $C_f$, a fourth node N4 which is arranged between the first phase switch $Q_{IU}$ and the phase winding A, a fifth node N5 which is arranged between the phase winding A and the second phase switch $Q_{ID}$, a first diode Dc which is connected to the discharge switch $Q_F$ in parallel, a second diode $D_{IU}$ which is connected between the third node N3 and the fifth node N5, and a third diode $D_{ID}$ which is connected between the fourth node N4 and the fifth node N5.

The inverter circuit 20 has four modes, which are classified into a discharge current excitation mode, an input current excitation mode, an energy retrieving mode, and a power charging mode according to switch driving schemes. The four modes will be described below with reference to FIGS. 3 to 4.

FIGS. 3 to 6 are circuit diagrams showing closed loops formed in four modes, which are classified into the discharge current excitation mode, the input current excitation mode, the energy retrieving mode, and the power charging mode, respectively. Prior to the description of the four modes, it is assumed that the capacitor $C_f$ is previously charged with proper voltage.

Figure 3:
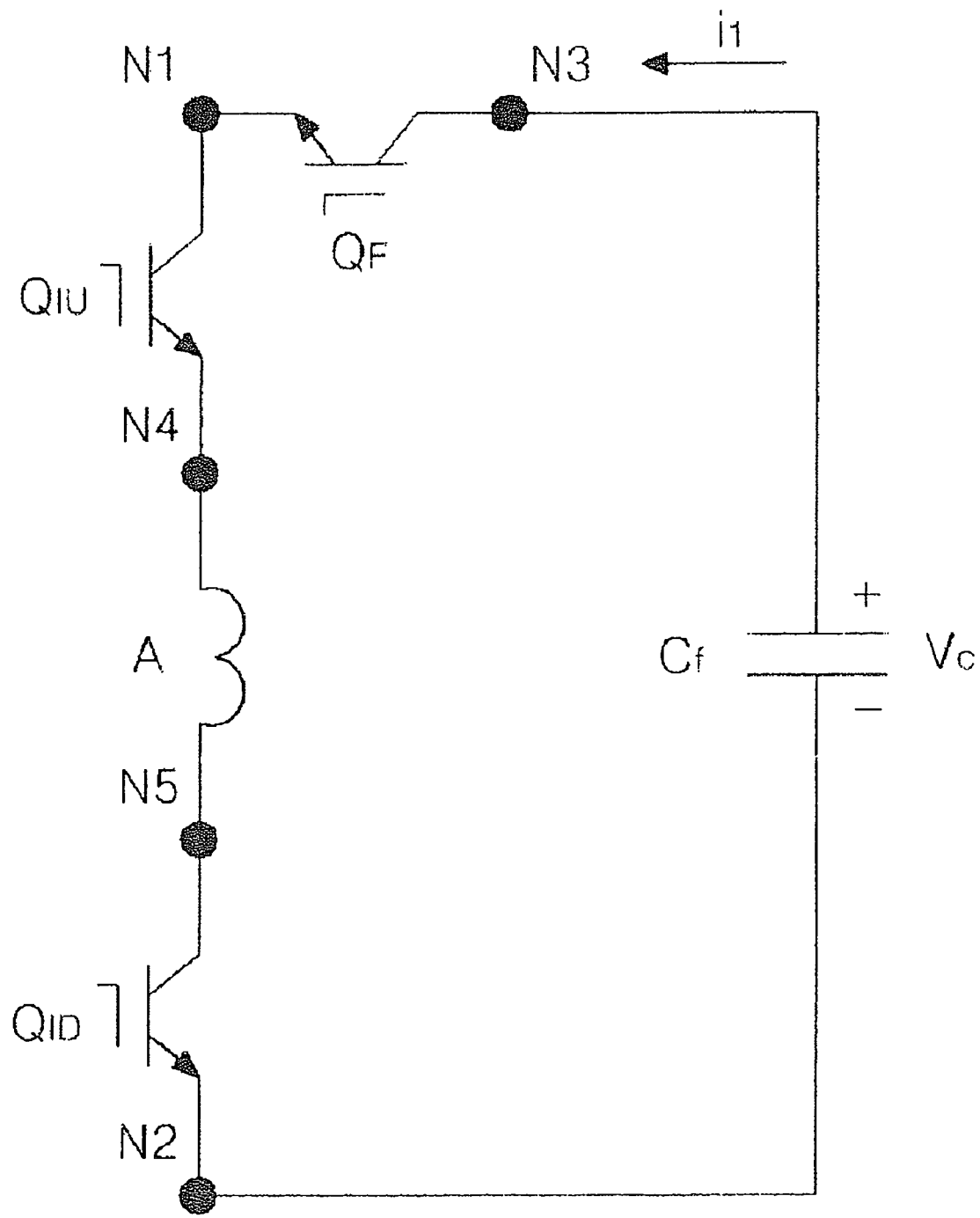
FIGS. 3 to 6 are circuit diagrams showing closed loops in driving modes according to an exemplary embodiment of the present invention.

Referring to FIG. 3, on the assumption that the discharge switch $Q_F$, the first phase switch $Q_{IU}$, and the second phase switch $Q_{ID}$ are turned on, the discharge current excitation mode occurs when the voltage charged in the capacitor $C_f$ is higher than the source voltage $V_s$. In this discharge current excitation mode, a first phase current $i_1$ of the SRM flows through a closed loop formed by the third node N3, the discharge switch $Q_F$, the first node N1, the first phase switch $Q_{IU}$, the fourth node N4, the inductor A, the fifth node N5, the second phase switch $Q_{ID}$, and the second node N2. When the inverter circuit 20 operates in the discharge current excitation mode for current establishment duration, high voltage charged in the capacitor $C_f$ can quickly generate a required phase current. When the inverter circuit 20 operates in the discharge current excitation mode for lower power supply duration, much time is unnecessary for generating the desired phase current, or the desired phase current may be generated. In this case, a circuit equation is represented as Equation 1.

$$V_c = Ri_1 + L_{min}\frac{di_1}{dt} = \frac{1}{C_f}\int i_1 dt \quad \text{Equation 1}$$

In Equation 1, R denotes a phase resistance value of the SRM, $i_1$ denotes a first phase current value, $L_{min}$ denotes the minimum inductance value of the single-phase SRM, and $C_f$ denotes a capacitance value used for retrieving energy.

Meanwhile, when the inverter circuit 20 operates in the discharge current excitation mode for torque generation duration, electrical energy charged in the capacitor Cf may be converted into mechanical energy of the single-phase SRM. In addition, when the inverter circuit 20 operates in the discharge current excitation mode for low source voltage duration, the single-phase SRM can produce a phase current desired for generating load torque, so that the ripple of output torque occurring due to variable source voltage can be reduced. In this case, a circuit equation is represented as Equation 2.

$$V_c = Ri_1 + L(\theta)\frac{di_1}{dt} + i_1\frac{dL(\theta)}{d\theta}\varpi_{rm} = \frac{1}{C_f}\int i_1 dt \quad \text{Equation 2}$$

In Equation 2, R denotes a phase resistance value of the SRM, $i_1$ denotes the first phase current value, $L(\theta)$ denotes an inductance value of the single-phase SRM, $C_f$ denotes a capacitance value, which is used for retrieving energy, and $\varpi_{rm}$ denotes a rotational speed of the single-phase SRM.

Figure 4:
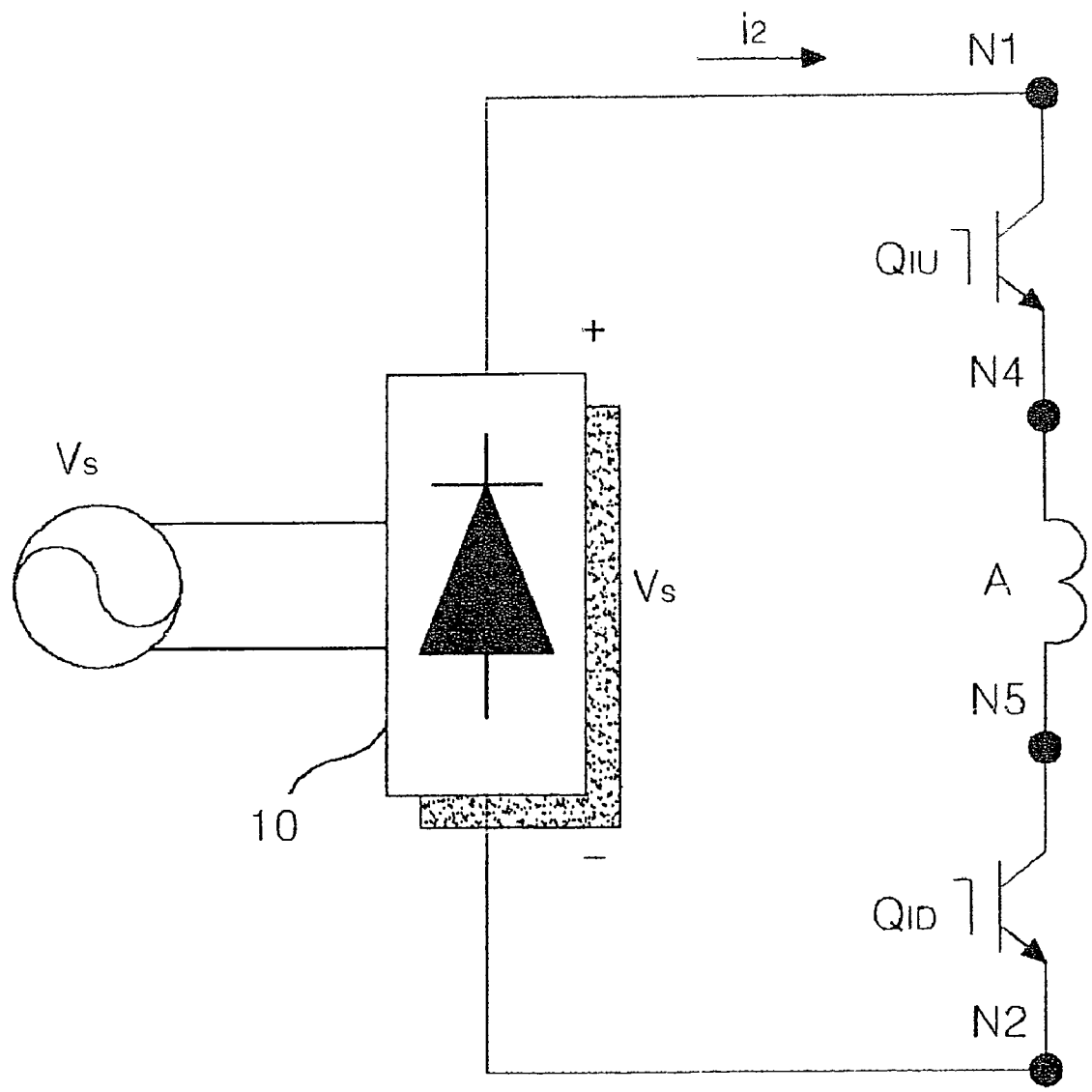

Referring to FIG. 4, on the assumption that the first phase switch $Q_{IU}$ and the second phase switch $Q_{ID}$ are turned on, the input current excitation mode occurs when the source voltage $V_s$ is higher than the voltage of the capacitor $C_f$, or the discharge switch $Q_F$ is turned off. In this case, a second phase current $i_2$ of the single-phase SRM flows through a closed loop formed by the diode rectifier 10, the first node N1, the first phase switch $Q_{IU}$, the fourth node N4, the inductor A, the fifth node N5, the second phase switch $Q_{ID}$, and the second node N2. When the inverter circuit 20 operates in the input current excitation mode for the current establishment duration, a desired phase current is generated from the source voltage $V_s$. In other words, the desired phase current is directly generated from the source voltage $V_s$ without passing through the capacitor $C_f$ in the section of the source voltage $V_s$ having a high level. In this case, a circuit equation is represented as Equation 3.

$$V_s = Ri_2 + L_{min}\frac{di_2}{dt} \quad \text{Equation 3}$$

Meanwhile, when the inverter circuit 20 operates in the input current excitation mode for the torque generation duration, the electrical energy of the voltage source can be converted into the mechanical energy of the single-phase SRM, so that a power factor of the driving system is improved. In this case, a circuit equation is represented as Equation 4.

$$V_s = Ri_2 + L(\theta)\frac{di_2}{dt} + i_2\frac{dL(\theta)}{d\theta}\varpi_{rm} \qquad \text{Equation 4}$$

Figure 5:
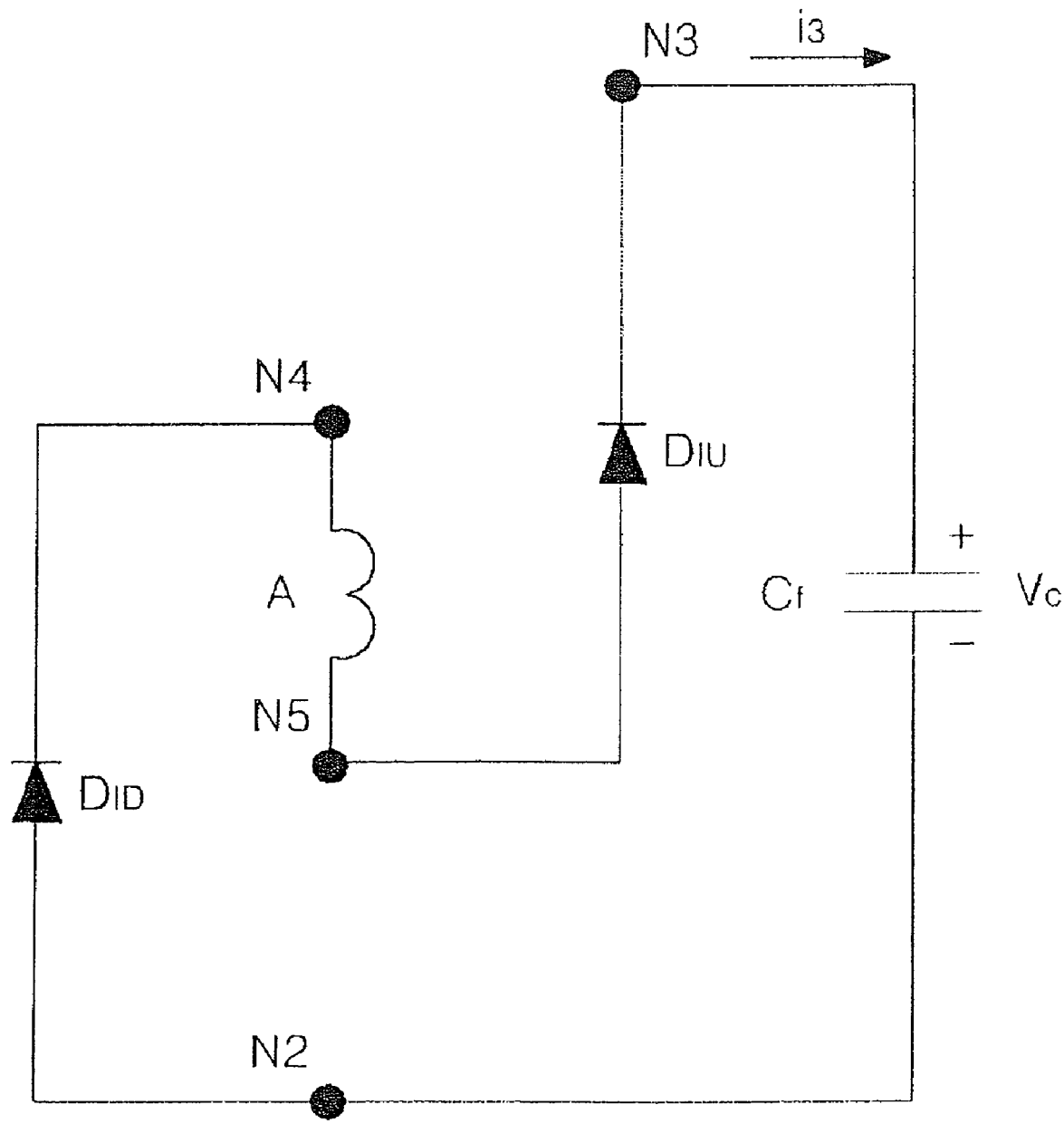

Referring to FIG. 5, the energy retrieve mode starts when the discharge switch $Q_F$, the first phase switch $Q_{IU}$, and the second phase switch $Q_{ID}$ are turned off, such that reactive power remaining in the phase winding A is retrieved to the capacitor $C_f$ through the third diode $D_{ID}$ and the second diode $D_{IU}$ which is a wheeling diode. In other words, in the energy retrieve mode, a retrieve current $i_3$ flows along a closed loop formed by the second node $N_2$, the third diode $D_{ID}$, the fourth node $N_4$, the phase winding A, the fifth node $N_5$, the second diode $D_{IU}$, the third node $N_3$, and the capacitor $C_f$, thereby retrieving energy to the capacitor $C_f$. In this case, a circuit equation is represented as Equation 5.

$$-V_c = Ri_3 + L(\theta)\frac{di_3}{dt} + i_3\frac{dL(\theta)}{d\theta}\varpi = \frac{1}{C_f}\int i_3 dt \qquad \text{Equation 5}$$

Figure 6:
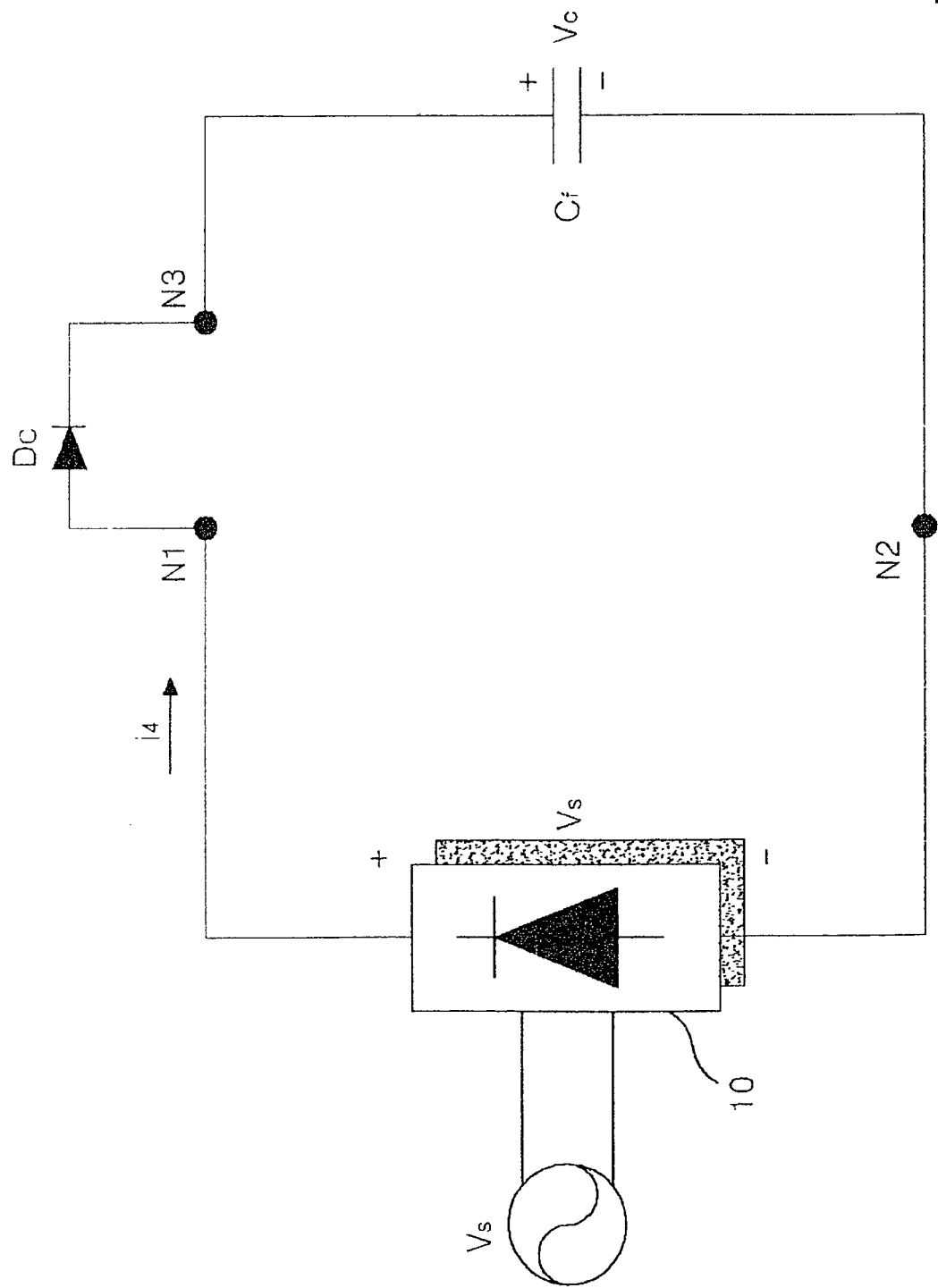

Referring to FIG. 6, when the source voltage $V_s$ is higher than the voltage of the capacitor $C_f$, the power charging mode occurs regardless of the first phase switch $Q_{IU}$ and the second phase switch $Q_{ID}$. In the power charging mode, a close loop is formed by the second node N2, the source voltage $V_s$, the first node N1, the first diode $D_c$, the third node N3, and the capacitor $C_f$, so that the energy of the source voltage $V_s$ can be supplied to the capacitor $C_f$. In this case, a charging current $i_4$, which flows through the capacitor $C_f$, is shown in Equation 6.

$$V_s = -V_c = -\frac{1}{C_f}\int i_4 dt \qquad \text{Equation 6}$$

Figure 7:
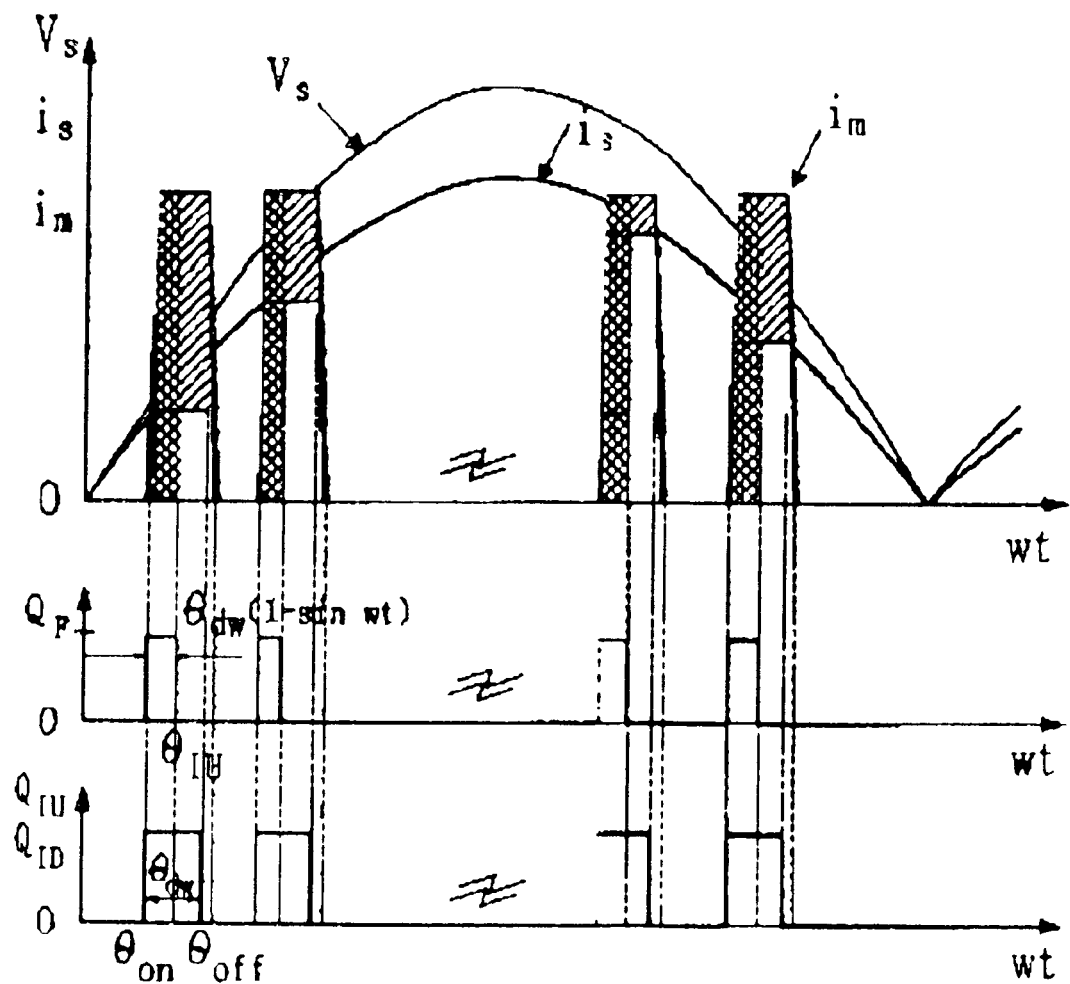
FIG. 7 is a graph showing the switching topology of a single-phase SRM driving circuit according to an exemplary embodiment of the present invention.

Thus, the single-phase SRM driving circuit according to an exemplary embodiment of the present invention represents switching topology as shown in FIG. 7.

FIG. 7 is a graph showing switching topology used to restrict torque ripples and improve a power factor.

As shown in FIG. 7, in order to generate output torque having reduced output torque ripples for the torque generation duration of the single-phase SRM, the phase current of the single-phase SRM must be constant similar to current $i_m$. In addition, a source current is must have a sinusoidal waveform and a phase identical to those of the source voltage $V_s$, such that the SRM can have a high power factor.

Accordingly, in order to satisfy the above two conditions, the capacitor $C_f$, which is used to retrieve charged energy, compensates for the difference between the phase current and the source current by using electrical energy stored in the capacitor $C_f$. In other words, in order to restrict torque ripples and improve a power factor, the operational periods in the discharge current excitation mode and the input current excitation mode are suitably adjusted, so that the electrical energy difference can be compensated. The compensation of the electrical energy can be achieved by adjusting an on/off switching point of a discharge switch $Q_F$ for conduction duration which is turn-on duration of the first phase switch $Q_{IU}$ and the second phase switch $Q_{ID}$.

In other words, when the area of a part marked as ⊠ is identical to the area of a part marked as ⊡, the difference of electrical energy is compensated. To this end, Equations 7 and 8 must be satisfied.

$$i_m \cdot \theta_x = i_s \cdot \theta_{dw} \qquad \text{Equation 7}$$

$$\theta_x \theta_{dw} \sin\theta \qquad \text{Equation 8}$$

In this case, $\theta_x$ denotes the duration for which the SRM operates in the input current excitation mode, and $\theta_{dw}$ denotes a dynamic dwell angle. Meanwhile, for duration of $\theta_{dw}(1-\sin\theta)$, the single-phase SRM operates in the discharge current excitation mode, and the electrical energy of the SRM is supplied from the voltage source. In addition, current becomes $i_s^*$ greater than $i_s$ at the voltage input side as described above.

Details about the restriction of torque ripples of the capacitor $C_f$ in the single-phase SRM having the above switching topology according to an exemplary embodiment of the present invention will be described in detail with reference to FIG. 8.

Figure 8:
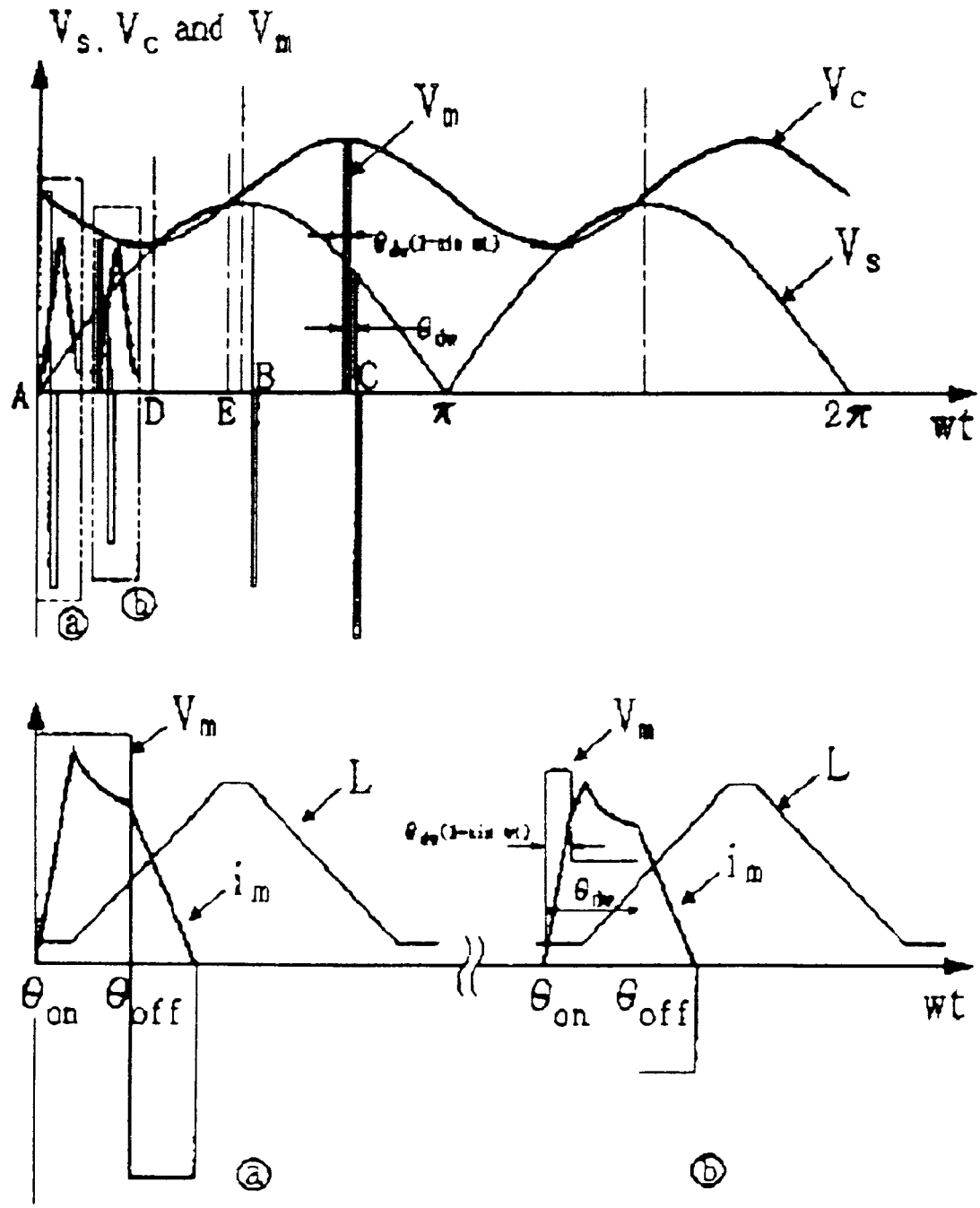
FIG. 8 shows graphs for analyzing the reduction of torque ripples by a charging capacitor of a single-phase SRM driving circuit according to an exemplary embodiment of the present invention.

FIG. 8 shows graphs waveforms of components of the SRM, which are the source voltage $V_s$, the capacitor voltage $V_c$, and, the phase voltage $V_m$ and the phase current $i_m$ of the single-phase SRM, when the inverter circuit is driven according to an exemplary embodiment of the present invention.

As shown in FIG. 8, it is assumed that the source voltage $V_s$ is represented as Equation 9.

$$V_s = V_{sm}\sin\overline{\omega}t(\overline{\omega}t\epsilon[0,\pi]) \qquad \text{Equation 9}$$

According to the switching topology, the SRM mainly receives energy from the voltage source for the duration of high source voltage $V_s$. In this case, the charge energy of the capacitor $C_f$ is greater than the discharge energy of the capacitor $C_f$ so that the voltage of the capacitor Cf increases. In contrast, the discharge energy of the capacitor $C_f$ becomes greater than the charge energy of the capacitor $C_f$ for the duration of low voltage source Vs, so that the voltage of the capacitor $C_f$ is lowered. The waveforms of the voltage $V_s$ and $V_c$ are shown as curves in a upper portion of the graph shown in FIG. 8. Especially, for DE duration, the source voltage $V_s$ is greater than the capacitor voltage $V_c$, and the voltage source directly supplies energy to the SRM and the capacitor $C_f$. In this case, for the purpose of analysis, it is assumed that the voltage waveform of the capacitor $C_f$ is modified so as to form a sinusoidal wave satisfying Equation 10. The assumption is possible when calculation points related to energy do not exist for DE duration.

$$V_c = V_{c-av} - V_{cm}\sin 2\overline{\omega}t \qquad \text{Equation 10}$$

In this case, it is assumed that the SRM rotates at a speed of $\overline{\omega}_{rm}$ with the dynamic dwell angle of $\theta_{dw}$ and an advanced angle of $\theta_{ad}$.

Meanwhile, as shown in FIG. 8, since the source voltage $V_s$ has 0 at a point A, the SRM is driven by the charged voltage of the capacitor $C_f$ for the entire duration of the dynamic dwell angle. In addition, the SRM is driven by the source voltage $V_s$ at a point B for the entire duration of the dynamic dwell angle.

The three types of energy at the point A are represented as Equations 11, 12, and 13, respectively, in which the three types of energy are the discharge energy $W_{1A}$ of the capacitor $C_f$ for current establishment duration, the discharge energy $W_{2A}$ of the capacitor $C_f$ for torque generation duration, and the charge energy $W_{3A}$ of the capacitor $C_f$ for current extinction duration for which magnetic field energy is retrieved.

$$W_{1A} = \frac{1}{2}\cdot\frac{V_{c-av}^2}{\varpi_{rm}^2}\cdot\frac{\theta_{ad}^2}{L_{min}} \qquad \text{Equation 11}$$

$$W_{2A} = \frac{V_{c-av}^2}{K\varpi_{rm}^2} \cdot \left\{ (\theta_{dw} - \theta_{ad}) + \frac{K\theta_{ad} - L_{min}}{K} \ln\left(\frac{L_{off}}{L_{min}}\right) \right\}$$ Equation 12

$$W_{3A} = \frac{V_{c-av}^2}{K\varpi_{rm}^2} \cdot \left\{ \begin{array}{c} -\theta_{dw} + \frac{K\theta_{dw} + L_{off}}{K} \\ \ln\left(\frac{K\theta_{dw} + L_{off}}{L_{off}}\right) \end{array} \right\}$$ Equation 13

In Equations 11, 12, and 13, $W_{1A}$, $W_{2A}$, and $W_{3A}$ represent the charge/discharge energy of the capacitor $C_f$ for the current establishment duration, the torque generation duration, and the current extinction duration, respectively. $L_{min}$ and $L_{off}$ represent the minimum inductance value of the SRM and the value of the inductance A when the first phase switch $Q_{IU}$ and the second phase switch $Q_{ID}$ are turned off, respectively. $K(\theta)$ represents an inductance increasing rate according to the position of a rotator for inductance increasing duration.

Meanwhile, after the three duration, that is, the current establishment duration, the torque generation duration, and the current extinction duration, the electrical energy $\Delta WA$ newly charged in the capacitor $C_f$ is represented as following Equation 14.

$$\Delta W_A = -2C\varpi \frac{2\pi}{P\varpi_{rm}} V_{cm} V_{c-av}$$ Equation 14

In Equation 14, C, $\bar{\omega}$, and P represent the capacity of the capacitor $C_f$, a power frequency, and the number of poles of the rotor, respectively.

In addition, at the point B, the charge/discharge energy of the capacitor $C_f$ is '0' for the current establishment duration and the torque generation duration, and the charge energy $W_{3B}$ of the capacitor $C_f$ is represented as Equation 15 for the current extinction duration.

$$W_{3B} = \frac{V_{c-av}}{K\varpi_{rm}^2} \cdot \left\{ \begin{array}{c} -\theta_{dw} V_{sm} + \frac{K\theta_{d\varpi} V_{sm} + L_{off} V_{c-av}}{K} \\ \ln\left(\frac{K\theta_{dw} V_{sm} + L_{off} V_{c-av}}{L_{off} V_{c-av}}\right) \end{array} \right\}$$ Equation 15

Meanwhile, at the point B, after the current establishment duration, the torque generation duration, and the current extinction duration, the electrical energy $\Delta W_B$ newly charged in the capacitor $C_f$ is represented as Equation 16.

$$\Delta W_B = 2C\varpi \frac{2\pi}{P\varpi_{rm}} V_{cm} V_{c-av}$$ Equation 16

By the law of conservation of energy, the energy exchange relationship between the SRM and the capacitor Cf at points A and B satisfies following Equation 17.

$$-W_{1A} - W_{2A} + W_{3A} = \Delta W_A$$ Equation 17

$$W_{3B} = \Delta W_B$$

If Equation 17 is solved, the gains $V_{cm}$ and $V_{c-av}$ of a voltage equation of the capacitor $C_f$, which is represented as Equation 10, can be obtained. Accordingly, for one period of the source voltage, the maximum peak phase current $i_{max}$ and the minimum peak phase current $i_{min}$ are the maximum value and the minimum value of following Equation 18.

$$i_{limit} = \frac{1}{L_{min}} (V_c T_c + V_s T_s)$$ Equation 18

In this case, $$T_c = \frac{\theta_{dw}(1 - \sin\varpi t)}{\varpi_{rm}}, T_s = \frac{\theta_{ad}}{\theta_{rm}} - T_c$$

As a result, when the SRM is driven by the suggested inverter circuit 20, the maximum peak torque $T_{max}$ and the minimum peak torque $T_{min}$ of the SRM are obtained from following Equations 19 and 20.

$$T_{max} = \frac{1}{2} K i_{max}^2$$ Equation 19

$$T_{min} = \frac{1}{2} K i_{min}^2$$ Equation 20

Accordingly, when the SRM is driven by the suggested inverter circuit 20, the maximum peak torque ripple can be obtained from Equation 21

$$\Delta T_{max} = \frac{T_{max} - T_{min}}{T_{max} + T_{min}}$$ Equation 21

Hereinafter, the improvement for a torque ripple and a power factor of a single-phased SRM driving circuit according to an exemplary embodiment of the present invention will be proved by a simulation through a matrix laboratory (MAT-LAB) and a real test using test equipment shown in FIG. 9.

Figure 9:
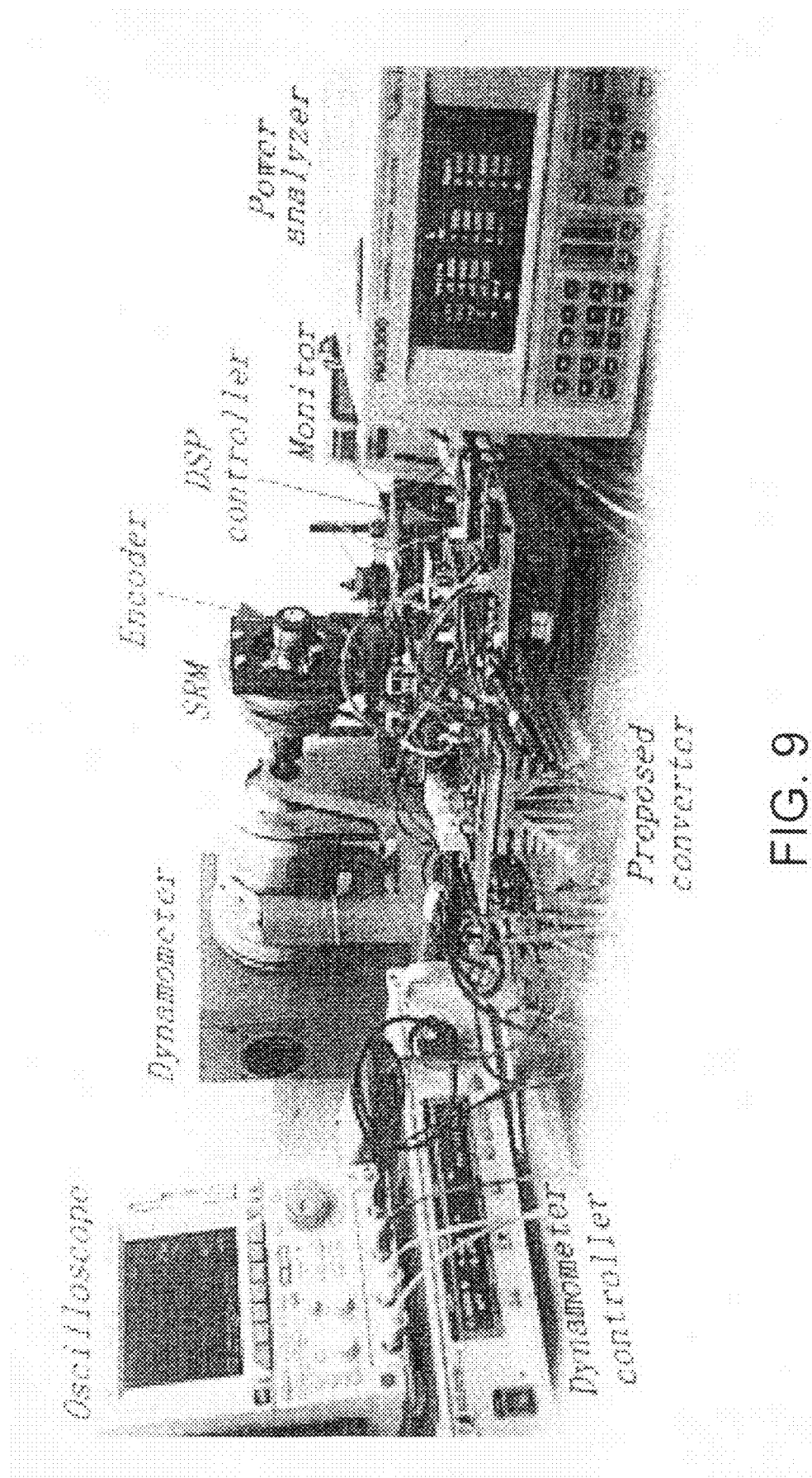
FIG. 9 is a view showing test equipment used to measure torque ripples and the improvement degree of a power factor of a single-phase SRM driving circuit according to an exemplary embodiment of the present invention.

Referring to FIG. 9, the test equipment of the single-phase SRM driving circuit according to an exemplary embodiment of the present invention includes an oscilloscope, a dynamometer controller, a dynamometer, an SRM, an SRM driving circuit, an encoder, a digital signal processing (DSP) controller, a monitor, and a power analyzer.

Hereinafter, details will be described with reference FIGS. 10 to 24 relative to test data for a power factor and torque ripples in the conventional single-phase SRM driving circuit and test data for a power factor and torque ripples in the single-phase SRM driving circuit according to an exemplary embodiment of the present invention obtained through a simulation using a matrix laboratory (MATLAB) and a real test using test equipment having the above components.

Figure 10:
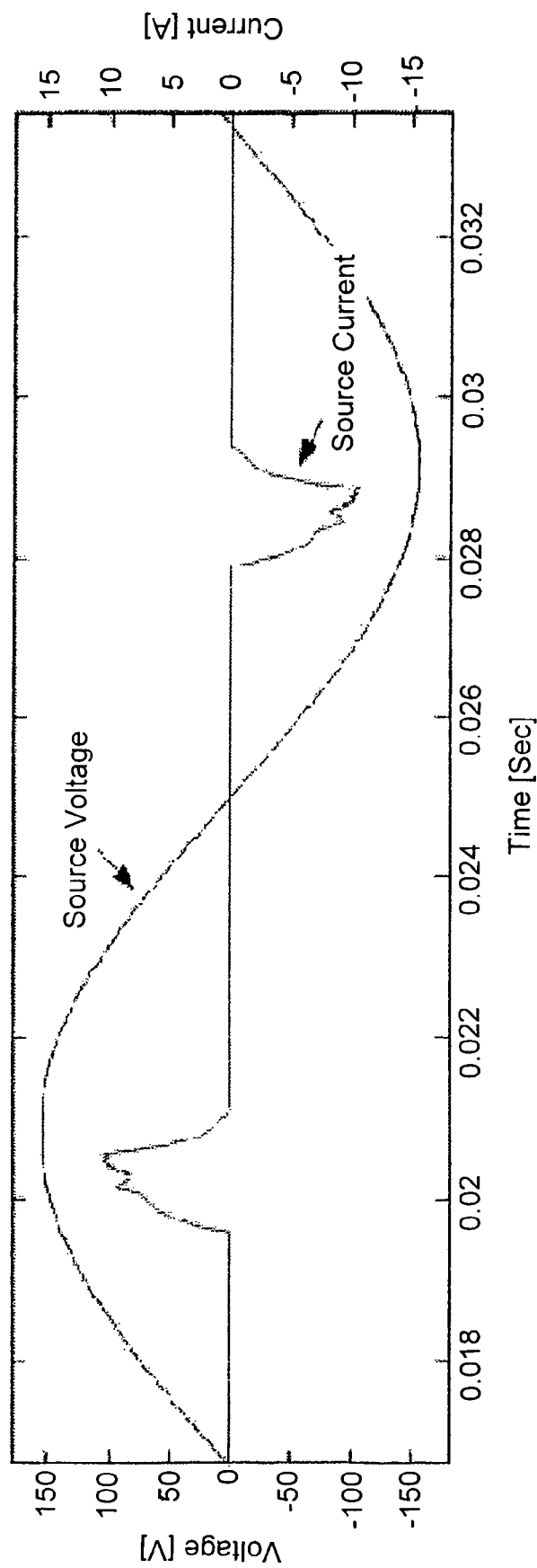
FIGS. 10 and 11 are graphs showing simulation values for current and voltage values at 6000 rpm in the conventional asymmetry inverter circuit and in an inverter circuit for improving a power factor according an exemplary embodiment of the present invention, respectively.
Figure 11:
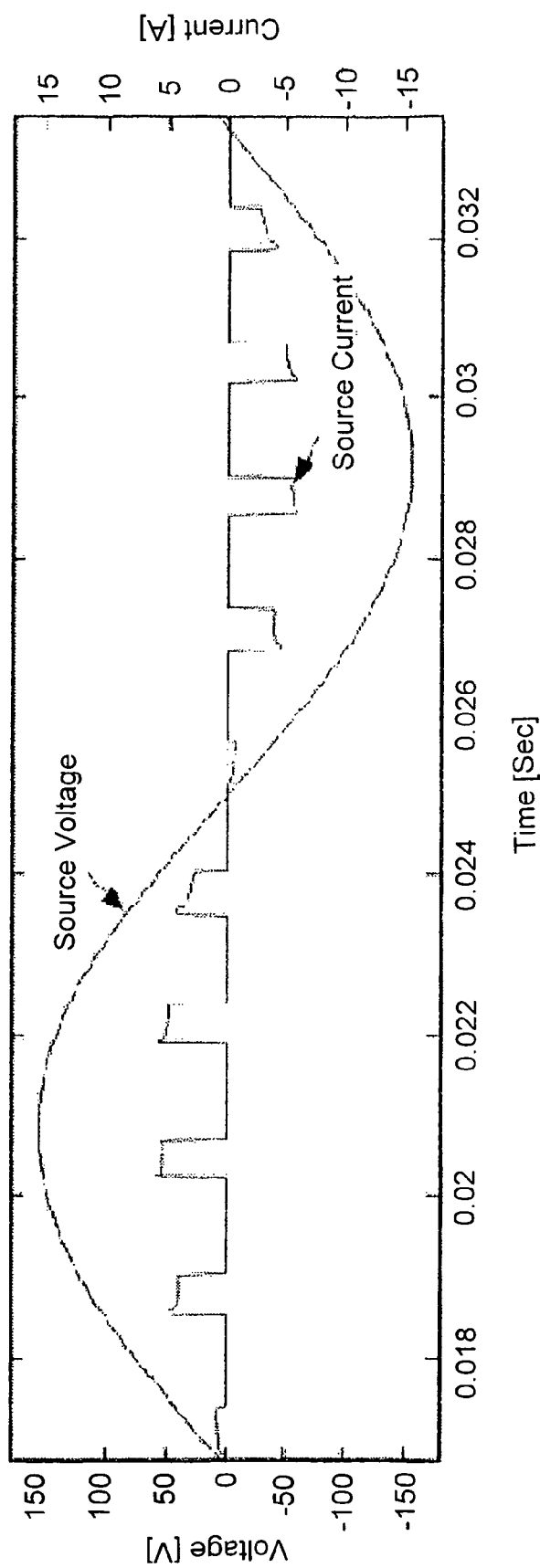

FIGS. 10 and 11 are graphs showing simulation values for current and voltage values at 6000 rpm in the conventional asymmetry inverter circuit and in an inverter circuit having an improved power factor according to an exemplary embodiment of the present invention, respectively. As shown in FIGS. 10 and 11, the conventional single-phase SRM driving circuit has a power factor of 0.34, and a high-power factor single-phase SRM driving circuit according to an exemplary embodiment of the present invention has a power factor of 0.44. Accordingly, it can be recognized from FIGS. 10 and 11 that a power factor is remarkably improved.

Figure 12:
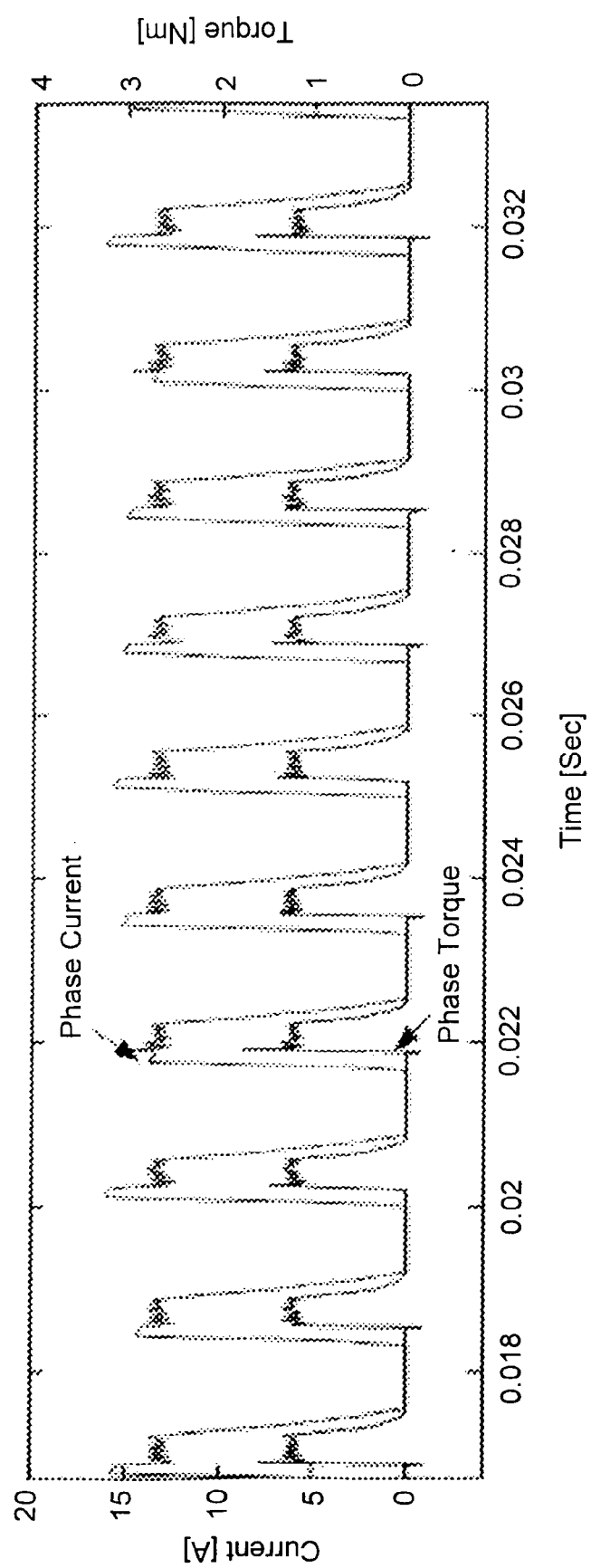
FIGS. 12 and 13 are graphs that show the waveforms of phase current and output torque in the conventional asymmetry inverter circuit and the waveforms of phase current and output torque of the high-power factor single-phase SRM driving circuit according to an exemplary embodiment of the present invention under the conditions shown in FIGS. 10 and 11.
Figure 13:
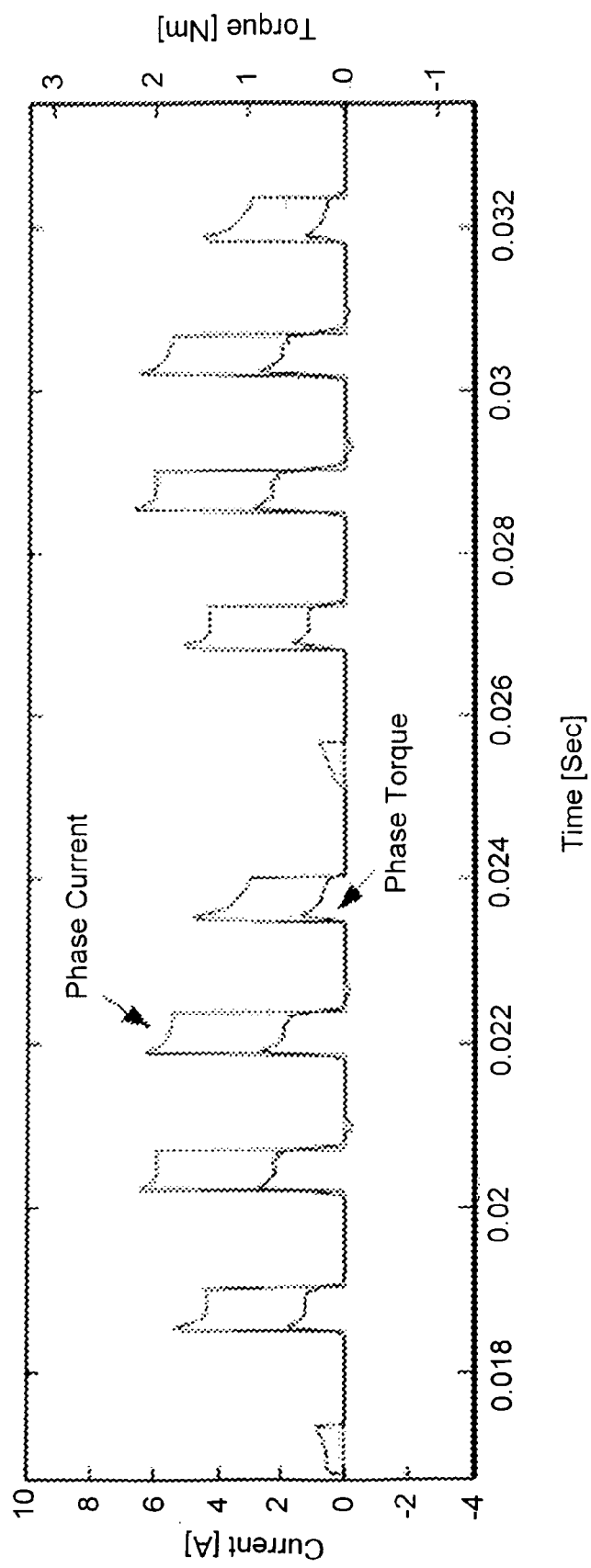

FIG. 12 is a graph showing the waveforms of phase current and output torque in the conventional asymmetry inverter circuit under the conditions shown in FIGS. 10 and 11. FIG. 13 is a graph showing the waveforms of phase current and output torque of the high-power factor single-phase SRM driving circuit according to an exemplary embodiment of the present invention under the conditions shown in FIGS. 10 and 11. It can be recognized from FIGS. 12 and 13 that not only is a high factor improved, but peak torque ripples are generated if the SRM is driven by the SRM driving circuit according to an embodiment of the present invention.

Figure 14:
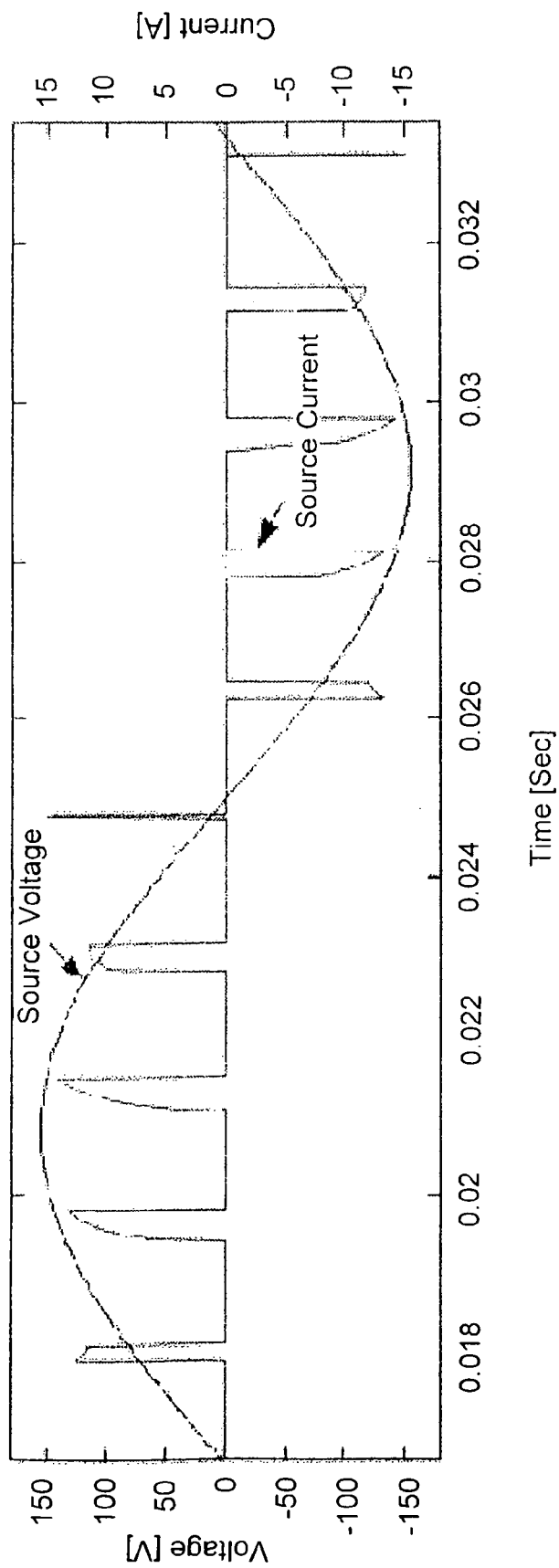
FIGS. 14 and 15 are graphs showing simulation results of source voltage, source current, phase current, and output torque in a high-power factor single-phase SRM driving circuit employing switching topology to reduce peak torque ripples at 6000 rpm according to an exemplary embodiment of the present invention.
Figure 15:
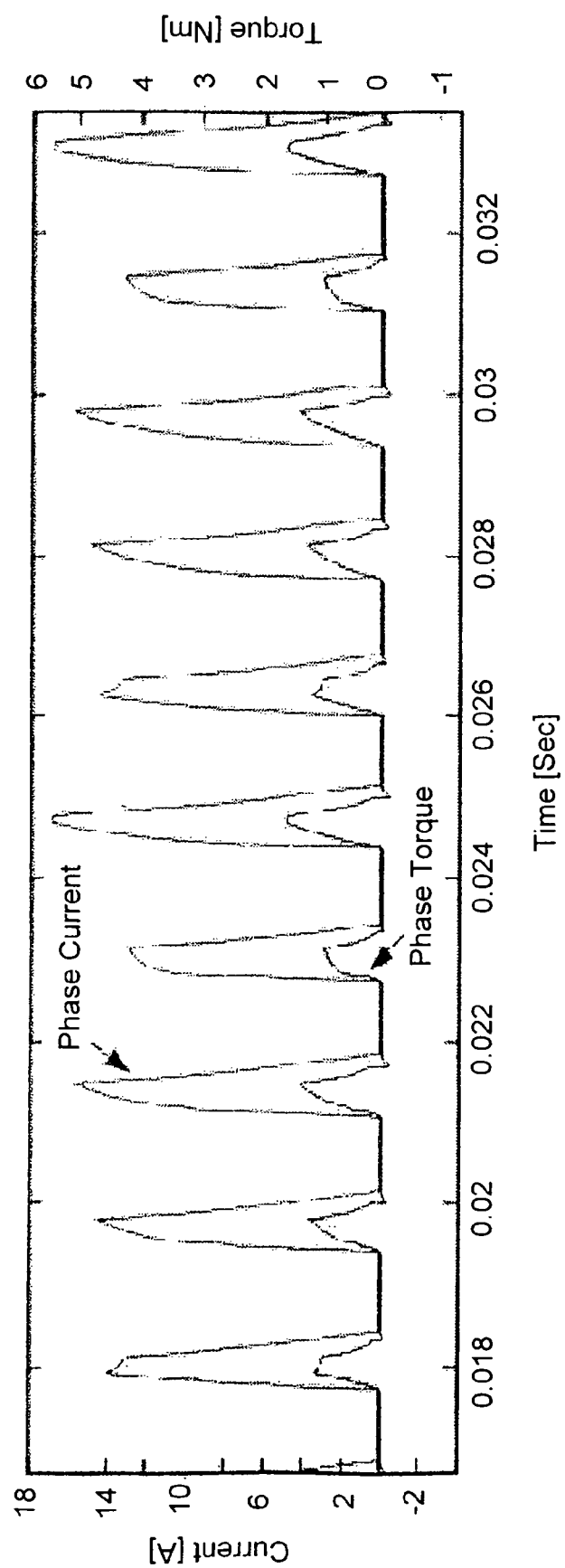

FIG. 14 is a graph showing a simulation result of source voltage and source current in the high-power factor single-phase SRM driving circuit employing switching topology to reduce peak torque ripples at 6000 rpm according to an exemplary embodiment of the present invention. FIG. 15 is a graph showing a simulation result of phase current and output torque in the high-power factor single-phase SRM driving circuit employing switching topology to reduce peak torque ripples at 6000 rpm according to an exemplary embodiment of the present invention.

Figure 16:
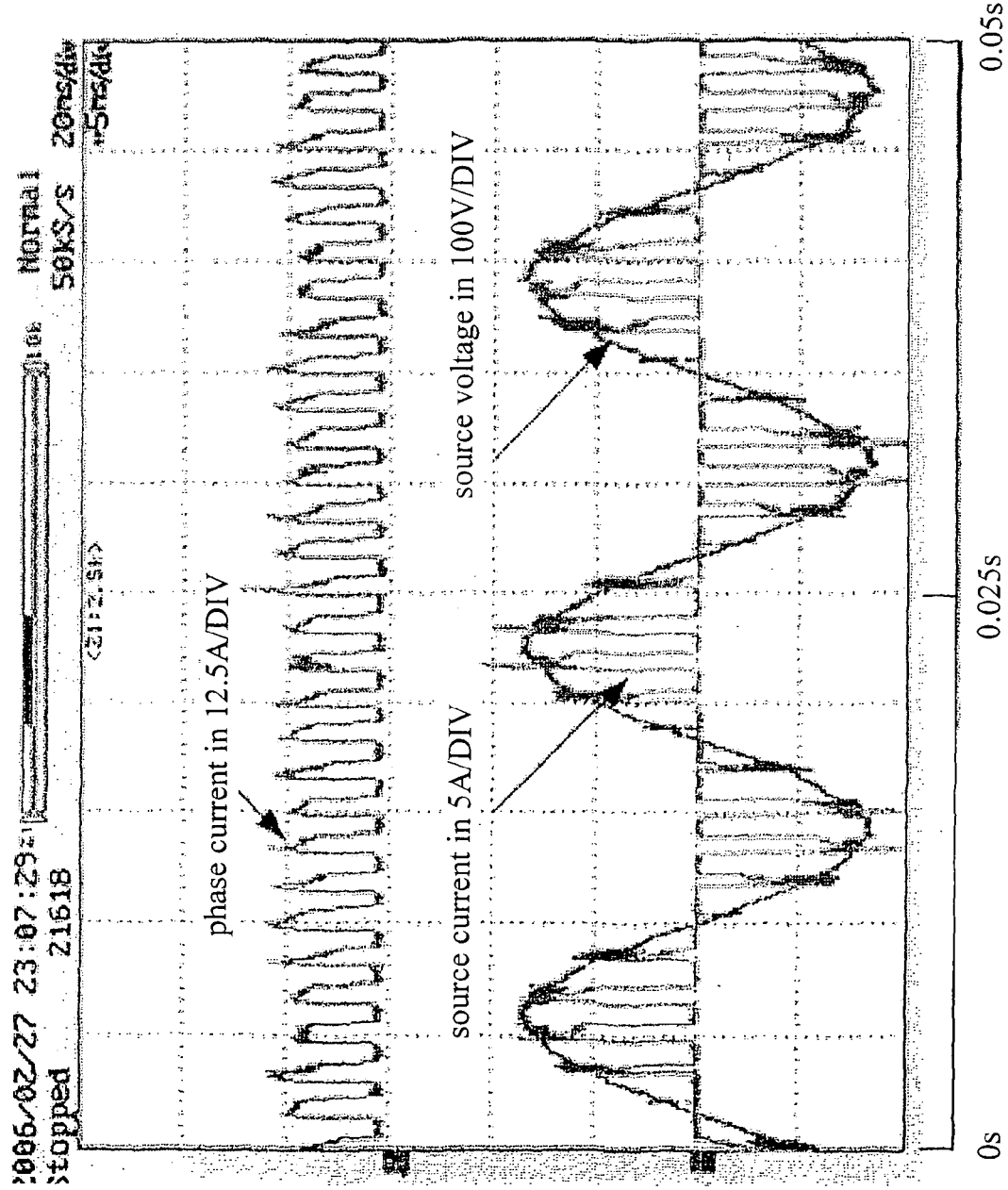
FIGS. 16 and 17 are graphs showing the waveforms of source voltage, source current, and phase when the switching topology at 6000 rpm according to an exemplary embodiment of the present invention is employed, and when the switching topology according to an exemplary embodiment of the present invention is not employed.
Figure 17:
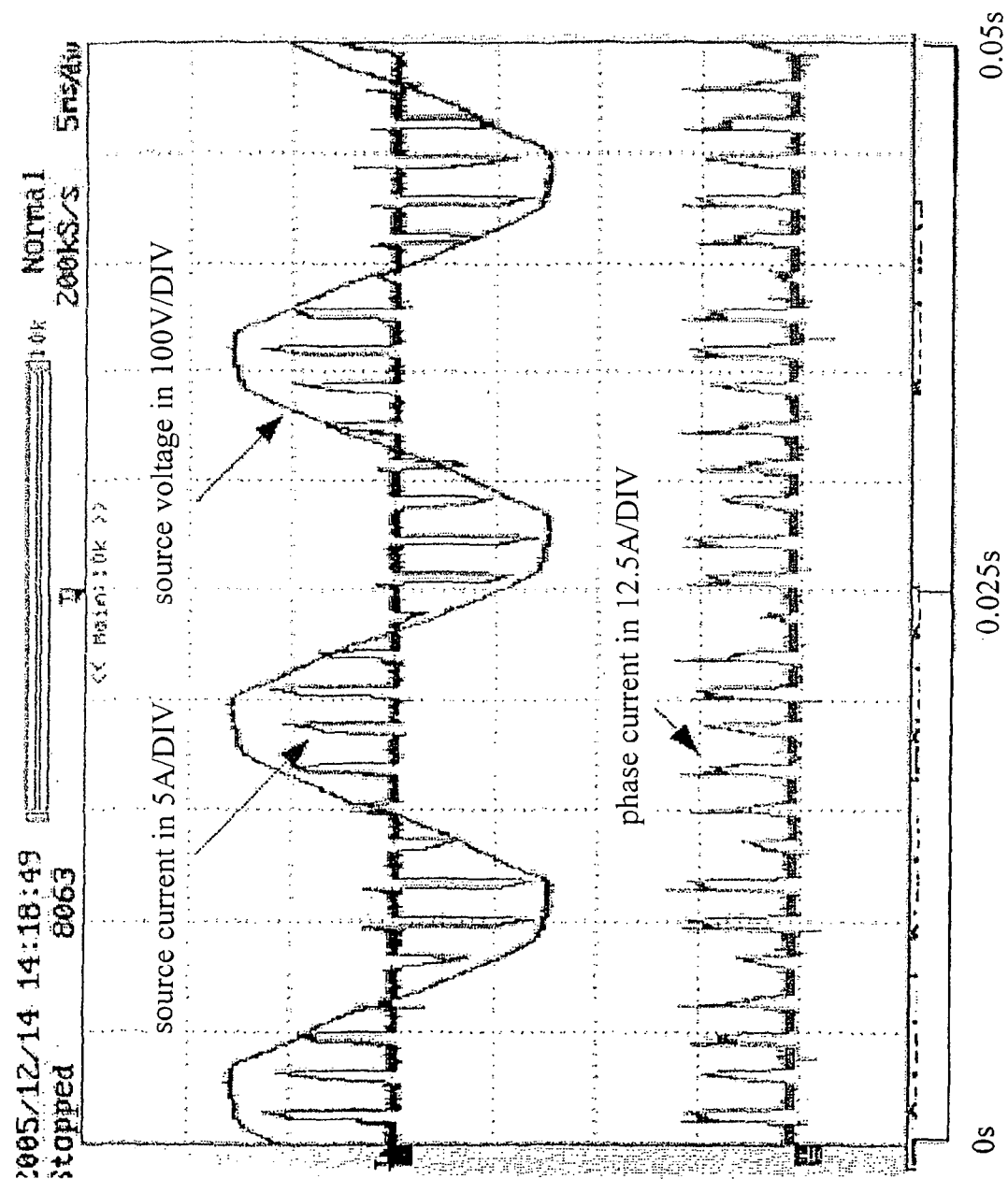

In addition, FIG. 16 is a graph showing the waveforms of source voltage, source current, and phase current through a real test when the switching topology at 6000 rpm according to an exemplary embodiment of the present invention is employed. FIG. 17 is a graph showing the waveforms of source voltage, source current, and phase current through a real test when the switching topology according to an exemplary embodiment of the present invention is not employed.

Figure 18:
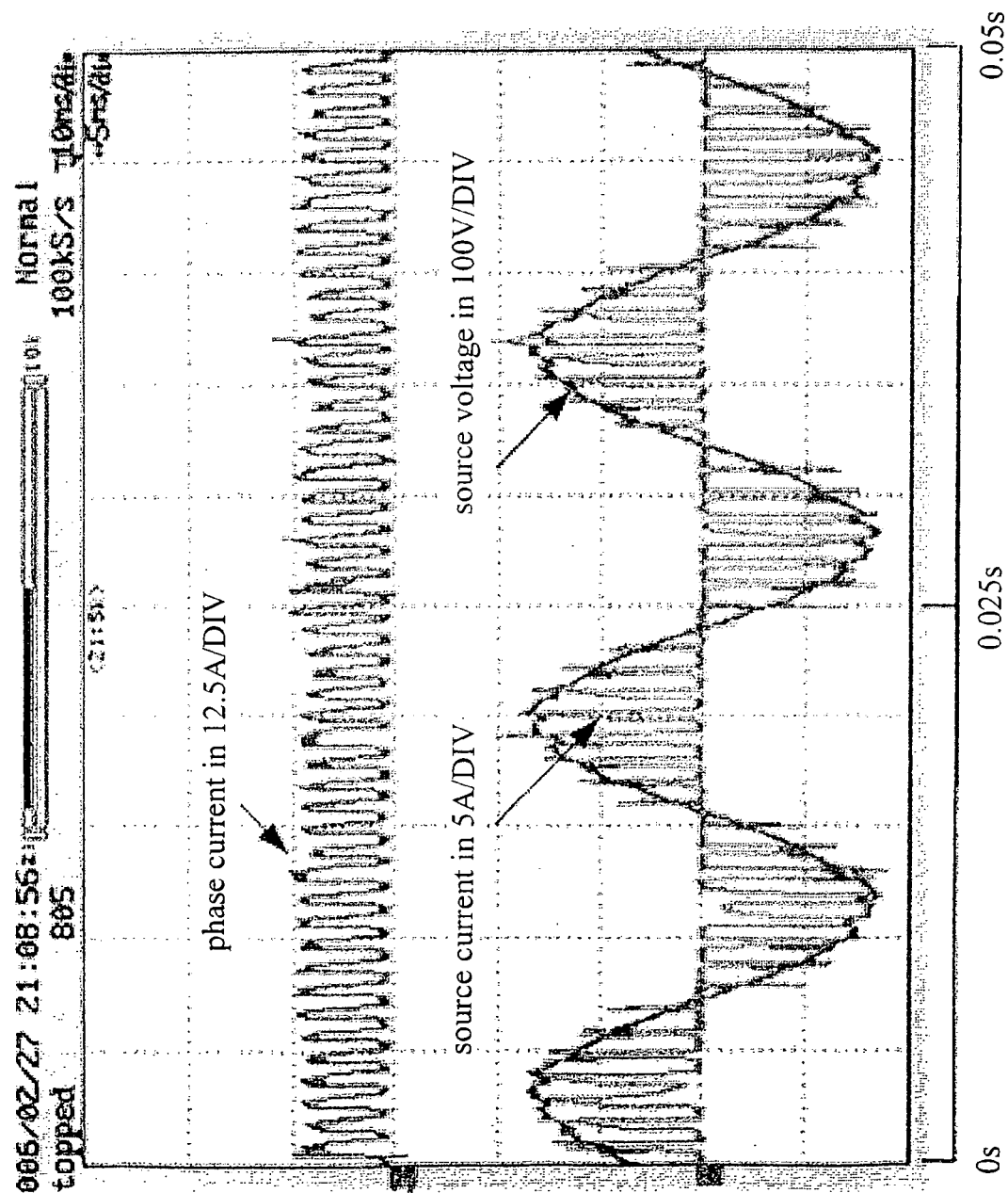
FIGS. 18 and 19 are graphs showing simulation results under an unloading condition and a rated load condition when employing switching topology at 9000 rpm according to an exemplary embodiment of the present invention.
Figure 19:
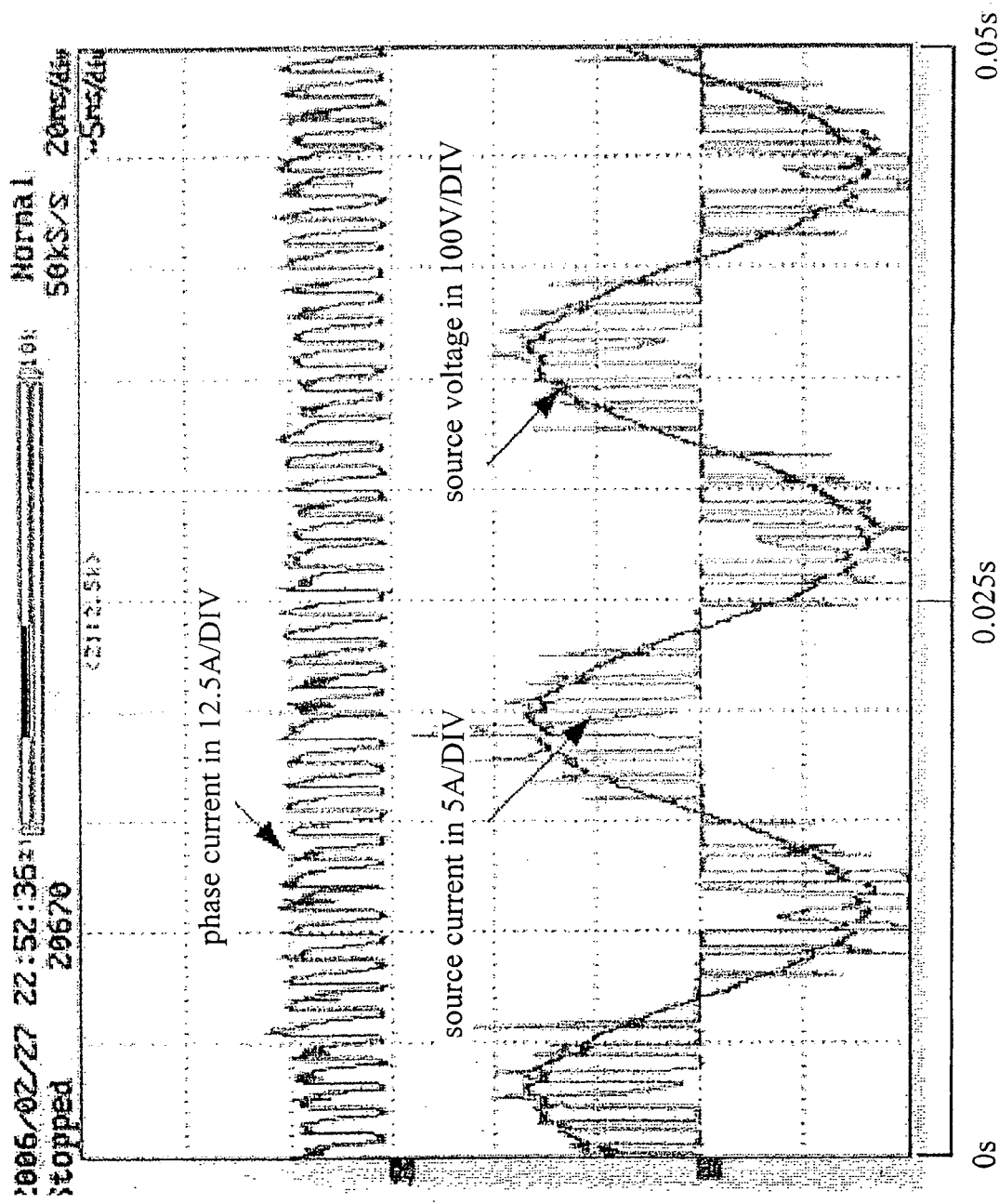

In addition, FIG. 18 is a graph showing a simulation result under an unloading condition when the switching topology at 9000 rpm according to an exemplary embodiment of the present invention is employed. FIG. 19 is a graph showing a simulation result under a rated load condition when the switching topology at 9000 rpm according to an exemplary embodiment of the present invention is employed.

Therefore, it can be recognized from the simulation results of FIGS. 14 and 15 and the result of the real test of FIGS. 17, 18, and 19 that the power factor is improved, and the peak torque ripples are restricted if the circuit for the improvement of the power factor shown in FIG. 2 is driven through the switching topology according to the present invention.

Figure 20:
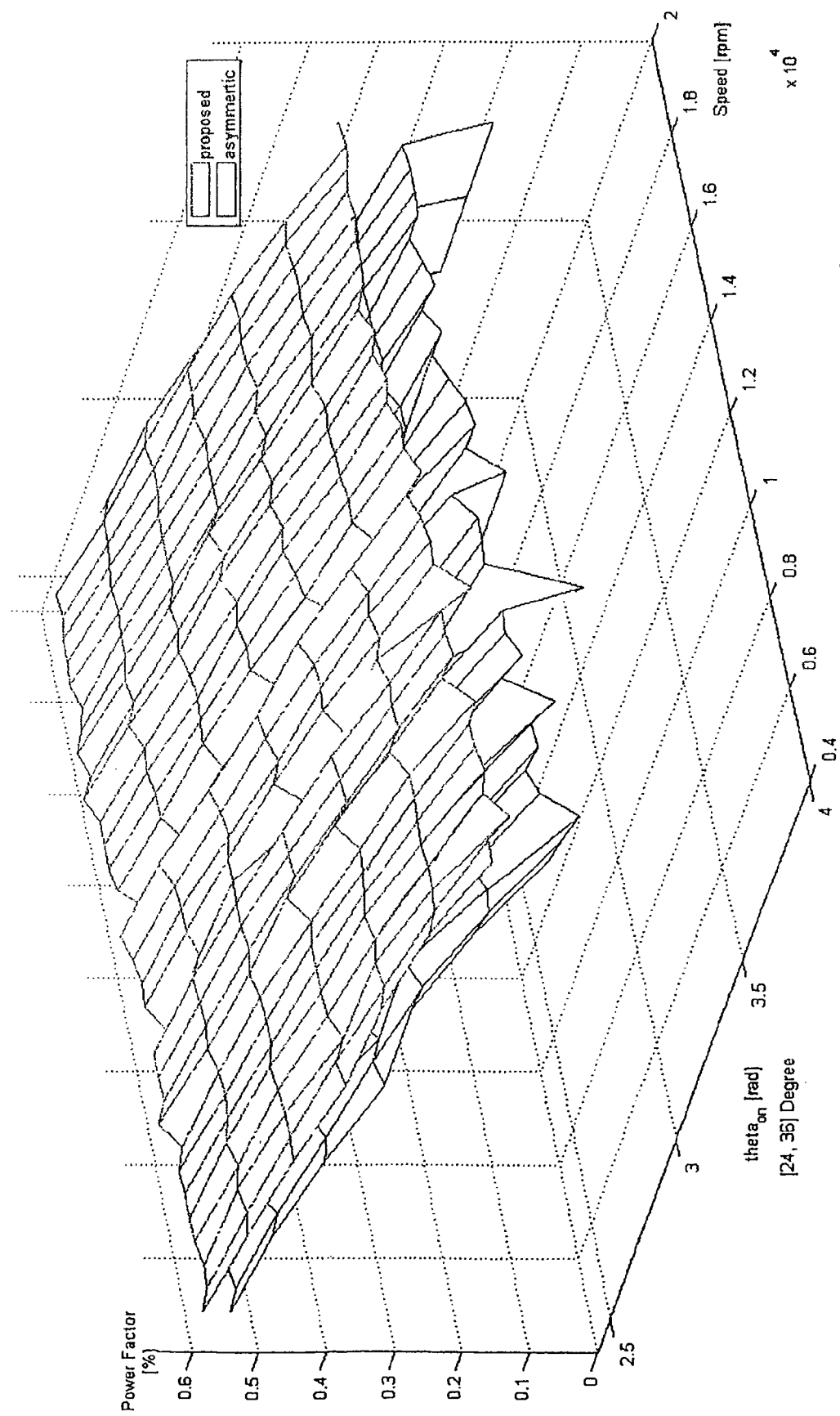
FIGS. 20 and 21 are graphs showing simulation results when employing the switching topology for the reduction of torque ripples for the inverter circuit for the improvement of the power factor according to the present invention and when employing the switching topology for the reduction of torque ripples for the conventional asymmetry inverter circuit.
Figure 21:
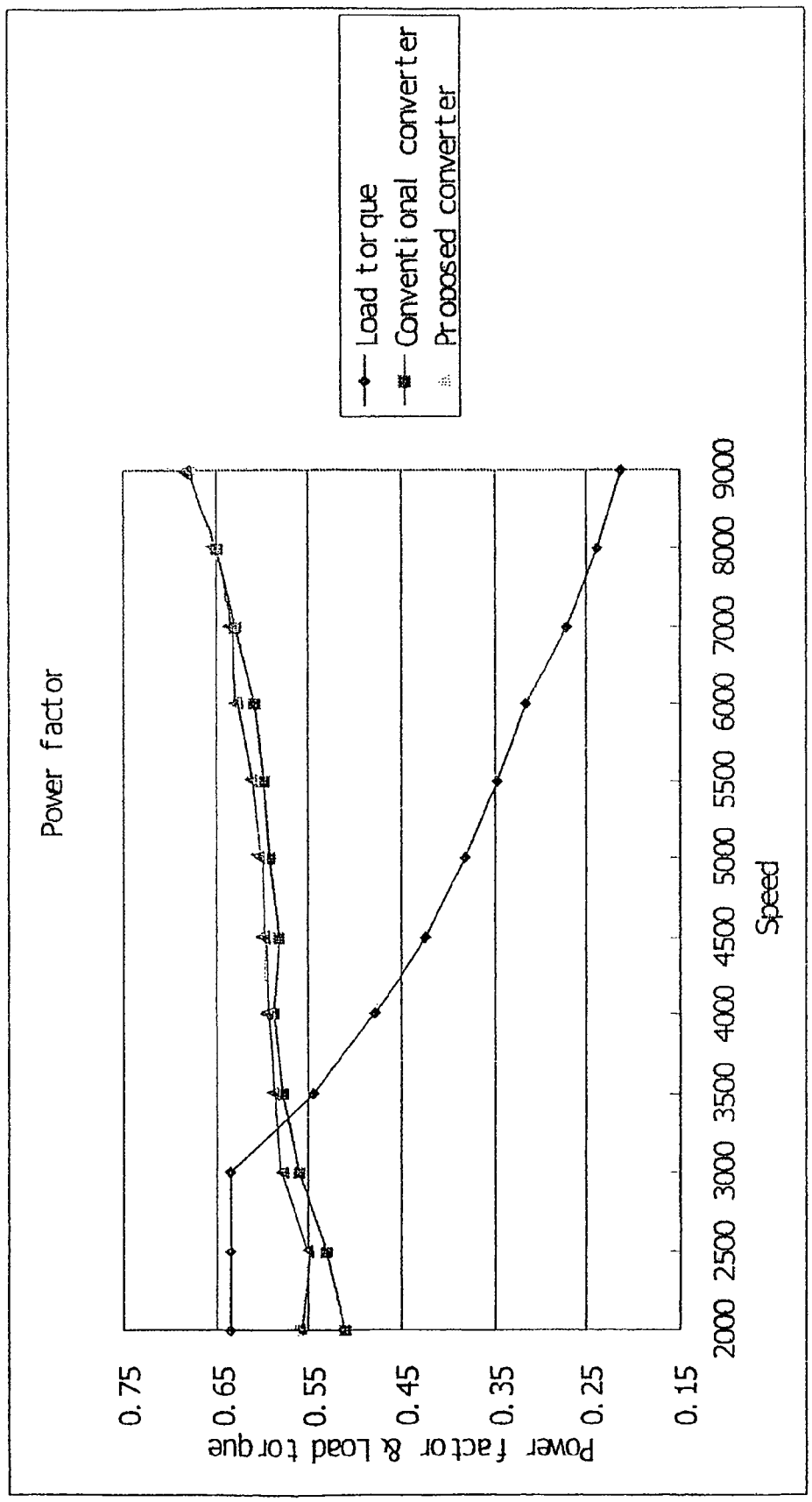

FIG. 20 is a graph showing simulation results when the switching topology used to reduce torque ripples is employed for the inverter circuit for the improvement of the power factor according to an exemplary embodiment of the present invention and when the switching topology used to reduce torque ripples is employed for the conventional asymmetry inverter circuit. FIG. 21 is a graph showing real test results under the conditions shown in FIG. 20. It can be recognized from FIGS. 20 and 21 that the power factor is remarkably improved by using the inverter circuit according to an exemplary embodiment of the present invention.

Figure 22:
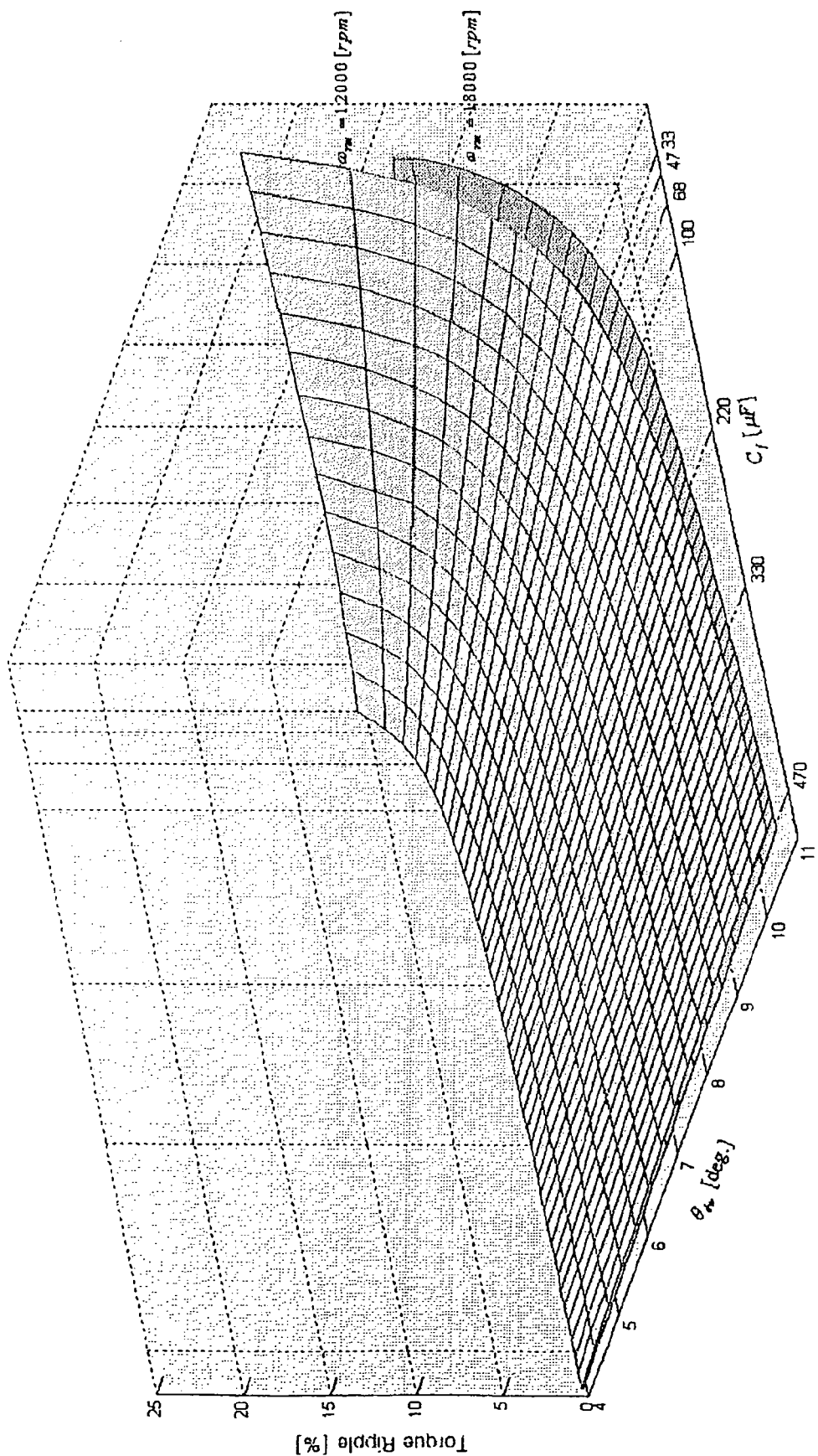
FIGS. 22 to 24 are graphs showing the maximum torque ripple values according to the rotational speed, an advanced angle, and the capacity of a capacitor of a single-phase SRM according to an exemplary embodiment of the present invention.
Figure 23:
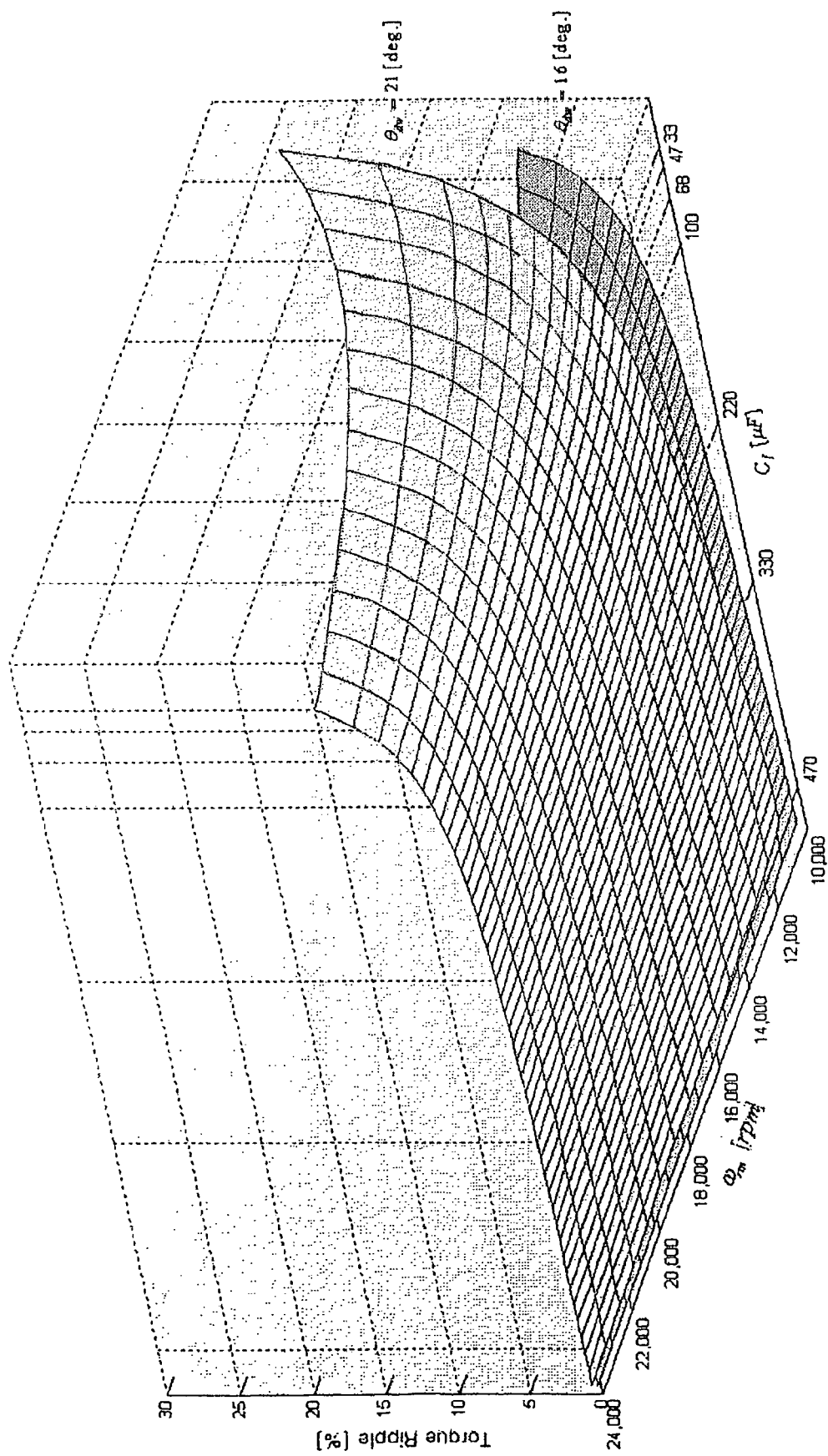
Figure 24:
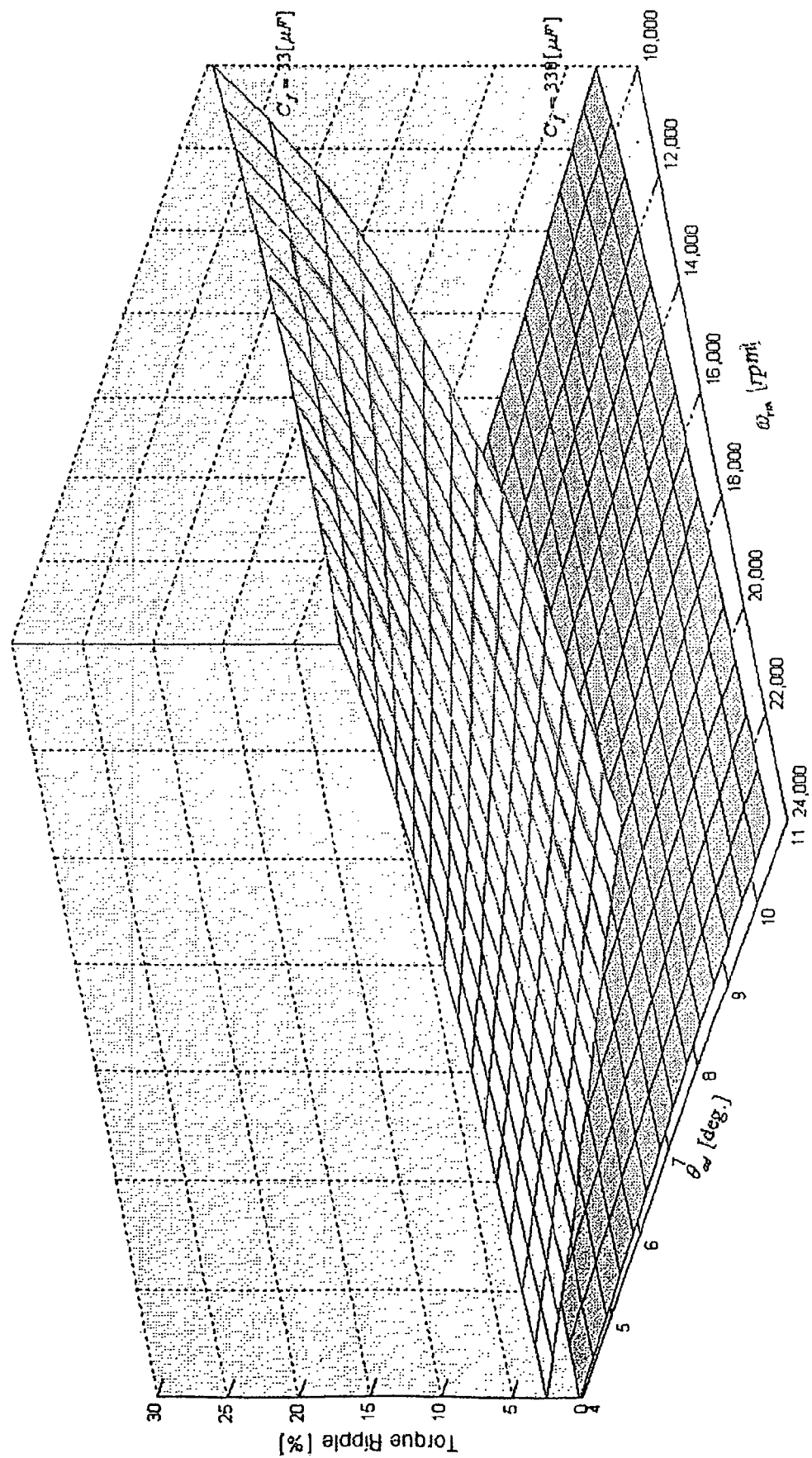

FIGS. 22 to 24 are graphs showing the maximum torque ripple value according to the rotational speed, the advanced angle, and the capacity of a capacitor of the single-phase SRM, which are obtained through the analysis method. Among them, FIGS. 22 to 24 are graphs showing the variation of the maximum peak torque ripples when the rotational speed is constant, when the advanced angle is constant, and when the capacitance value is constant, respectively. In addition, it can be recognized from FIGS. 22 to 24 that the maximum peak torque ripple increases according to the rotational speed, the increase of the advanced angle, and the reduction of the capacity of the capacitor when the circuit for the improvement of the power factor shown in FIG. 2 is driven through the switching topology according to the present invention. In addition, it can be recognized that the capacity of the capacitor may sensitively exert an influence upon the maximum torque ripple in the region where the capacity of the capacitor is small.

The invention claimed is:

1. A driving circuit for a single-phase switched reluctance motor, the driving circuit comprising:
 a switched reluctance motor;
 a voltage source which supplies energy to the switched reluctance motor; and
 an inverter circuit which is connected to the switched reluctance motor in parallel so as to temporarily store energy of the voltage source, and then supply the energy to the switched reluctance motor, wherein the inverter circuit comprises:
 a capacitor which is connected to the switched reluctance motor;
 a first node which is arranged between a first side of the switched reluctance motor and the capacitor;
 a second node which is arranged between a second side of the switched reluctance motor and the capacitor;
 a discharge switch which is connected between the first node and the capacitor;
 a first phase switch, a phase winding, and a second switch which are arranged between the first node and the second node;
 a third node which is arranged between the discharge switch and the capacitor;
 a fourth node which is arranged between the first phase switch and the phase winding;
 a fifth node which is arranged between the phase winding and the second phase switch;
 a first diode which is connected to the discharge switch in parallel;
 a second diode which is connected between the third node and the fifth node; and
 a third diode which is connected between the fifth node and the fourth node.

2. The driving circuit as claimed in claim 1, the inverter circuit and the voltage source alternately supply energy to the switched reluctance motor.

3. The driving circuit as claimed in claim 1, wherein, in the inverter circuit, if the first phase switch, the second phase switch, and the discharge switch are turned on, and if voltage of the capacitor is higher than voltage of the voltage source, a first closed loop is formed by the third node, the discharge switch, the first node, the first phase switch, the fourth node, the phase winding, the fifth node, the second phase switch, and the second node, and the voltage of the capacitor is supplied to the single-phase switched reluctance motor.

4. The driving circuit as claimed in claim 1, wherein, in the inverter circuit, if the first phase switch and the second phase switch are turned on, and if voltage of the voltage source is higher than voltage of the capacitor, or the discharge switch is turned off, a second closed loop is formed by the switched reluctance motor, the first node, the first phase switch, the fourth node, the phase winding, the fifth node, the second phase switch, and the second node, and the voltage of the voltage source is supplied to the switched reluctance motor.

5. The driving circuit as claimed in claim 1, wherein, in the inverter circuit, if the discharge switch, the first phase switch, and the second phase switch are turned off, a third closed loop is formed by the second node, the third diode, the fourth node, the phase winding, the fifth node, the second diode, the third node, and the capacitor, and energy stored in the phase winding is retrieved to the capacitor.

6. The driving circuit as claimed in claim 1, wherein, in the inverter circuit, if voltage of the voltage source is higher than voltage of the capacitor, a fourth closed loop is formed by the second node, the voltage source, the first node, the first diode, the third node, and the capacitor, and energy of the source voltage is supplied to the capacitor.

7. The driving circuit as claimed in claim 1, wherein voltage of the voltage source is voltage having a sinusoidal wave.

8. A driving method of a single-phase switched reluctance motor, the driving method comprising the steps of:
supplying energy of a voltage source to a switched reluctance motor; and
alternately supplying energy to the switched reluctance motor by an inverter circuit and the voltage source, wherein the switched reluctance motor includes current establishment duration, torque generation duration, and current retrieve duration, the inverter circuit includes an energy retrieving capacitor, and a discharge current excitation mode, an input current excitation mode, an energy retrieving mode, and a power charging mode.

9. The driving method as claimed in claim 8, wherein the inverter circuit charges energy of the voltage source while voltage of the voltage source is being supplied to the switched reluctance motor.

10. The driving method as claimed in claim 8, wherein, when the discharge current excitation mode starts for the current establishment duration, voltage of the capacitance is represented as $$V_c = Ri_1 + L_{min}\frac{di_1}{dt} = \frac{1}{C_f}\int i_1\,dt,$$

in which R denotes a phase resistance value of the switched reluctance motor, $L_{min}$ denotes a minimum inductance value of the switched reluctance motor, $C_f$ denotes a capacitance value used for retrieving energy, and $i_1$ denotes a first phase current value in the discharge current excitation mode.

11. The driving method as claimed in claim 8, wherein, when the discharge current excitation mode starts for the torque generation duration, voltage of the capacitor is represented as $$V_c = Ri_1 + L(\theta)\frac{di_1}{dt} + i_1\frac{dL(\theta)}{d\theta}\overline{\omega}_{rm} = \frac{1}{C_f}\int i_1\,dt,$$

in which R denotes a phase resistance value of the switched reluctance motor, $L(\theta)$ denotes an inductance value of the switched reluctance motor, $C_f$ denotes a capacitance value used for retrieving energy, $\overline{\omega}$ denotes a rotational speed of the switched reluctance motor, and $i_1$ denotes phase current in the discharge current excitation mode.

12. The driving method as claimed in claim 8, wherein, when the input current excitation mode starts for the current establishment duration, voltage of the voltage source is represented as $$V_s = Ri_2 + L_{min}\frac{di_2}{dt},$$

in which R denotes a phase resistance value of the switched reluctance motor, $L_{min}$ denotes a minimum inductance value of the switched reluctance motor, and $i_2$ denotes phase current in the input current excitation mode.

13. The driving method as claimed in claim 8, wherein, when the input current excitation mode starts for the torque generation duration, voltage of the voltage source is represented as $$V_s = Ri_2 + L(\theta)\frac{di_2}{dt} + i_2\frac{dL(\theta)}{d\theta}\overline{\omega}_{rm},$$

in which R denotes a phase resistance value of the switched reluctance motor, $L(\theta)$ denotes an inductance value of the switched reluctance motor, $\overline{\omega}_{rm}$ denotes a rotational speed of the switched reluctance motor, and $i_2$ denotes phase current in the input current excitation mode.

14. The driving method as claimed in claim 8, wherein, when R denotes a phase resistance value of the switched reluctance motor, $L(\theta)$ denotes an inductance value of the switched reluctance motor, $\overline{\omega}$ denotes a power frequency, $C_f$ denotes a capacitance value used for retrieving energy, and $i_3$ denotes phase current in the energy retrieve mode, energy retrieved in a capacitor used for retrieving energy is represented as an equation, $$-V_c = Ri_3 + L(\theta)\frac{di_3}{dt} + i_3\frac{dL(\theta)}{d\theta}\overline{\omega} = \frac{1}{C_f}\int i_3\,dt.$$

15. The driving method as claimed in claim 8, wherein voltage of the voltage source is represented as $$V_s = -V_c = -\frac{1}{C_f}\int i_4\,dt,$$

in which $C_f$ denotes a capacitance value used for retrieving energy and $i_4$ denotes phase current in the power charging mode.

16. The driving method as claimed in claim 8, wherein the source voltage and voltage of the capacitor are represented $V_s=V_{sm}\sin\overline{\omega}t$ ($\overline{\omega}t\in[0,\pi]$)) and $V_c=V_{c\text{-}av}-V_{cm}\sin 2\overline{\omega}t$ respectively, in which $V_s$ denotes voltage of the voltage source, $V_c$ denotes voltage of the capacitor, $V_m$ denotes voltage of the switched reluctance motor, $V_{sm}$ denotes a maximum value of the voltage of the voltage source, $V_{c\text{-}av}$ denotes an average value of charge voltage of the capacitor, and $V_{cm}$ denotes a fluctuation width of the charge voltage of the capacitor.

17. The driving method as claimed in claim 16, wherein the equation for the voltage of the capacitor is available only when the voltage of the voltage source is less than the voltage of the capacitor.

18. The driving method as claimed in claim 8, wherein, while the switched reluctance motor is being driven by voltage charged in the capacitor, discharge energy of the capacitor during the current establishment duration is represented as $$W_{1A} = \frac{1}{2}\cdot\frac{V_{c\text{-}av}^2}{\overline{\omega}_{rm}^2}\cdot\frac{\theta_{ad}^2}{L_{min}},$$

discharge energy of the capacitor for the torque generation duration is represented as $$W_{2A} = \frac{V_{c\text{-}av}^2}{K\overline{\omega}_{rm}^2}\cdot\left\{(\theta_{dw}-\theta_{ad})+\frac{K\theta_{ad}-L_{min}}{K}\ln\left(\frac{L_{off}}{L_{min}}\right)\right\},$$

charge energy of the capacitor for the current retrieve duration is represented as $$W_{3A} = \frac{V_{c\text{-}av}^2}{K\overline{\omega}_{rm}^2}\cdot\left\{-\theta_{dw}+\frac{K\theta_{dw}+L_{off}}{K}\ln\left(\frac{K\theta_{dw}+L_{off}}{L_{off}}\right)\right\},$$

and charge energy of the capacitor after the current establishment duration, the torque generation duration, and the current retrieve duration is represented as $$\Delta W_A = -2C\varpi \frac{2\pi}{P\varpi_{rm}} V_{cm} V_{c-av},$$

wherein $\theta_{dw}$ denotes a dynamic dwell angle of the switched reluctance motor, $\Gamma_{ad}$ denotes an advanced angle between a first time point, in which the switched reluctance motor is driven by the voltage charged in the capacitor, and a second time point, in which a front end portion of a polarity of a rotor meets an end portion of a polarity of a stator, $\overline{\omega}_{rm}$ denotes a rotational speed of the switched reluctance motor, $L_{min}$ denotes a minimum inductance value of the switched reluctance motor, $L_{off}$ denotes an inductance value when a phase switch connected to the capacitor is turned off, $K(\theta)$ denotes an inductance increasing rate according to position of the rotor to an inductor, C denotes capacity of the capacitor, $\overline{\theta}$ denotes a power frequency, and P denotes a number of poles of the rotor.

19. The driving method as claimed in claim 8, wherein, when the switched reluctance motor is driven by voltage of the voltage source, charge energy of the capacitor is represented as $$W_{3B} = \frac{V_{c-av}}{K\varpi_{rm}^2} \cdot \left\{ \begin{array}{c} -\theta_{dw} V_{sm} + \frac{K\theta_{d\varpi} V_{sm} + L_{off} V_{c-av}}{K} \\ \ln\left(\frac{K\theta_{dw} V_{sm} + L_{off} V_{c-av}}{L_{off} V_{c-av}}\right) \end{array} \right\}$$

for the current retrieve duration, and charge energy of the capacitor is represented as $$\Delta W_B = 2C\varpi \frac{2\pi}{P\varpi_{rm}} V_{cm} V_{c-av}$$

after the current establishment duration, the torque generation duration, and the current retrieve duration, in which $\theta_{dw}$ denotes a dynamic dwell angle of the switched reluctance motor, $\theta_{ad}$ denotes an advanced angle between a first time point, in which the switched reluctance motor is driven by the voltage charged in the capacitor, and a second time point, in which a front end portion of a polarity of a rotor meets an end portion of a polarity of a stator, $\overline{\omega}$ denotes a rotational speed of the switched reluctance motor, $L_{min}$ denotes a minimum inductance value of the switched reluctance motor, $L_{off}$ denotes an inductance value when a phase switch connected to the capacitor is turned off, $K(\theta)$ denotes an inductance increasing rate according to position of the rotor to an inductor, C denotes capacity of the capacitor, $\overline{\omega}$ denotes a power frequency, and P denotes a number of poles of the rotor.

20. The driving method as claimed in claim 8, wherein maximum peak phase current $i_{max}$ and minimum peak phase current $i_{min}$ are obtained from $$i_{lim\ it} = \frac{1}{L_{min}} (V_c T_c + V_s T_s)$$

when $$T_c = \frac{\theta_{dw}(1-\sin\varpi t)}{\varpi_{rm}}, \text{ and } T_s = \frac{\theta_{ad}}{\theta_{rm}} - T_c,$$

and a maximum peak torque ripple is represented as $$\Delta T_{max} = \frac{T_{max} - T_{min}}{T_{max} + T_{min}}$$

when $$T_{max} = \frac{1}{2} K i_{max}^2 \text{ and } T_{min} = \frac{1}{2} K i_{min}^2,$$

in which $V_s$ denotes voltage of the voltage source, $V_c$ denotes voltage of the capacitor, $\theta_{dw}$ denotes a dynamic dwell angle of the switched reluctance motor, $\theta_{ad}$ denotes an advanced angle between a first time point, in which the switched reluctance motor is driven by the voltage charged in the capacitor, and a second time point, in which a front end portion of a polarity of a rotor meets an end portion of a polarity of a stator, $\overline{\omega}_{rm}$ denotes a rotational speed of the switched reluctance motor, and $L_{min}$ denotes a minimum inductance value of the switched reluctance motor.

21. The driving method as claimed in claim 8, wherein phase current of the switched reluctance motor has a constant value, and current by voltage of the voltage source has a phase identical to a phase of the voltage of the voltage source.

22. The driving method as claimed in claim 8, wherein a capacitor supplies energy to the switched reluctance motor prior to the voltage source.

23. A driving method for a switched reluctance motor, the driving method comprising the steps of:
supplying energy to the switched reluctance motor by a voltage source for duration corresponding to a value obtained by multiplying a dynamic dwell angle of the switched reluctance motor by a sinusoidal function for present position information; and
supplying energy to the switched reluctance motor by a charged capacitor for remaining duration of the dynamic dwell angle.

* * * * *